(12) United States Patent  (10) Patent No.: US 7,575,114 B2
Buchko                    (45) Date of Patent:     Aug. 18, 2009

(54) CONVEYOR BELT CONSTRUCTION FOR A PLATEN-TYPE CONVEYOR

(75) Inventor: Raymond G. Buchko, Neenah, WI (US)

(73) Assignee: CP Packaging, Inc., Appleton, WI (US)

( * ) Notice: Subject to any disclaimer, the term of this patent is extended or adjusted under 35 U.S.C. 154(b) by 340 days.

(21) Appl. No.: 11/265,348

(22) Filed: Nov. 2, 2005

(65) Prior Publication Data

US 2006/0096838 A1    May 11, 2006

Related U.S. Application Data

(60) Provisional application No. 60/625,304, filed on Nov. 5, 2004.

(51) Int. Cl.
*B65G 17/46* (2006.01)
*B65G 17/30* (2006.01)
(52) U.S. Cl. .............. 198/867.14; 198/689.1; 198/813; 198/803.5; 53/403; 53/95
(58) Field of Classification Search ............ 198/689.1, 198/813, 867.14, 718; 53/95, 403; 24/37
See application file for complete search history.

(56) References Cited

U.S. PATENT DOCUMENTS

| 934,321 | A | | 9/1909 | Kidwell |
| 1,827,327 | A | | 10/1931 | Noble |
| 3,062,578 | A | | 11/1962 | Bushong |
| 3,199,317 | A | * | 8/1965 | Walsh ............ 68/22 B |
| 3,340,668 | A | | 9/1967 | Bofinger |
| 3,637,249 | A | | 1/1972 | Kuhl et al. |
| 3,669,007 | A | * | 6/1972 | Pulici ............ 99/450.6 |
| 3,693,314 | A | | 9/1972 | Reid et al. |
| 3,707,219 | A | | 12/1972 | Seragnoli |
| 3,774,778 | A | | 11/1973 | Flaig |
| 3,857,222 | A | | 12/1974 | Grebe |
| 3,958,391 | A | | 5/1976 | Kujubu |
| 4,189,897 | A | | 2/1980 | Ailey et al. |
| 4,480,425 | A | | 11/1984 | Furukawa |

(Continued)

FOREIGN PATENT DOCUMENTS

DE         3421971       12/1985

(Continued)

*Primary Examiner*—Gene Crawford
*Assistant Examiner*—Kavel P Singh
(74) *Attorney, Agent, or Firm*—Boyle Fredrickson, S.C.

(57) ABSTRACT

A conveyor belt construction includes a flexible conveyor belt defining inner and outer surfaces, and a series of clamp assemblies that are used to mount conveying members to the conveyor belt. One of the clamp members defines a convex engaging area that engages one of the surfaces of the conveyor belt, and the other of the clamp members defines a concave engaging area that engages the other surface of the conveyor belt. The clamp members are secured together and the belt is sandwiched between the concave and convex areas of the clamp members. The conveyor belt construction is engaged about a pair of rotatable members. The concave and convex areas of the clamp members take up a length of the conveyor belt, to tighten the conveyor belt onto the rotatable members without the use of a belt tensioner. The conveying members may be in the form of platens mounted to the outer clamp members.

21 Claims, 28 Drawing Sheets

U.S. PATENT DOCUMENTS

| | | | |
|---|---|---|---|
| 4,640,081 A | | 2/1987 | Kawaguchi et al. |
| 5,155,969 A | * | 10/1992 | Kuethe .................... 53/86 |
| 5,752,369 A | | 5/1998 | Suga |
| 5,779,236 A | * | 7/1998 | Duncan et al. ............ 271/276 |
| 5,779,238 A | * | 7/1998 | Josa-Patermann ........ 273/153 S |
| 6,216,848 B1 | * | 4/2001 | Zens ...................... 198/689.1 |
| 6,695,124 B2 | * | 2/2004 | Nixon ...................... 198/588 |
| 6,854,244 B2 | | 2/2005 | Pike |
| 6,862,867 B2 | | 3/2005 | Cady et al. |
| 7,140,167 B2 | | 11/2006 | Countz |

FOREIGN PATENT DOCUMENTS

| | | |
|---|---|---|
| DE | 3926496 | 3/1990 |
| DE | 4309888 | 9/1994 |
| DE | 29605872 | 7/1996 |
| FR | 1574118 | 7/1969 |
| FR | 2370652 | 6/1978 |
| JP | 08058938 | 3/1996 |

* cited by examiner

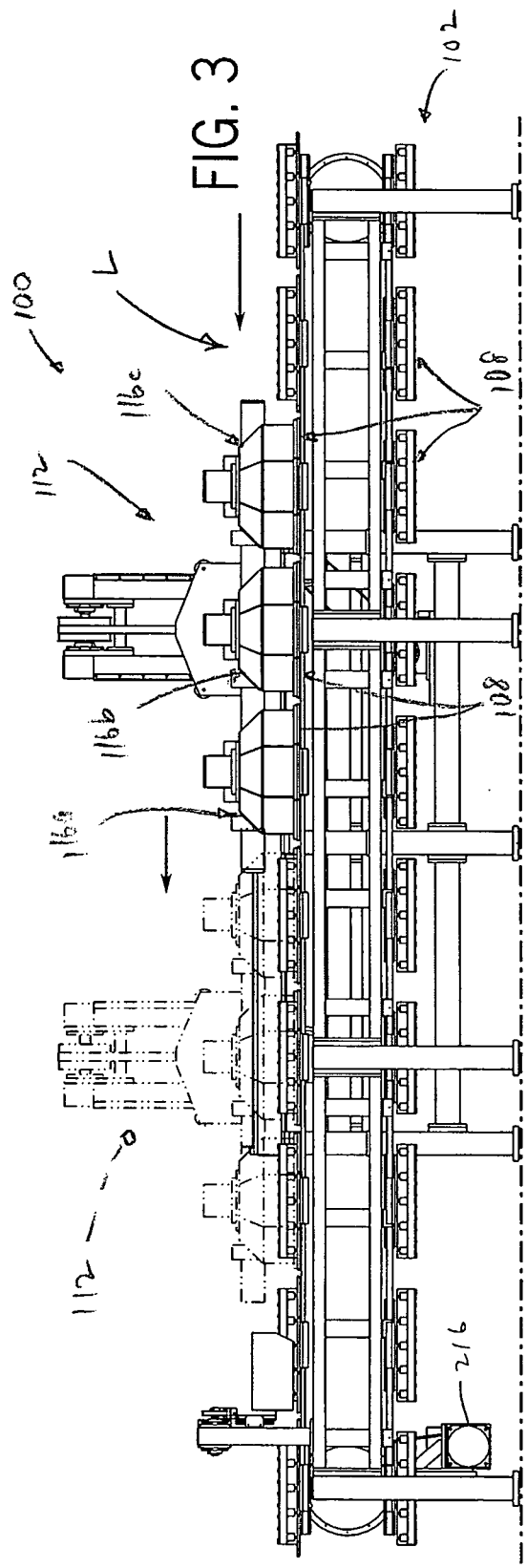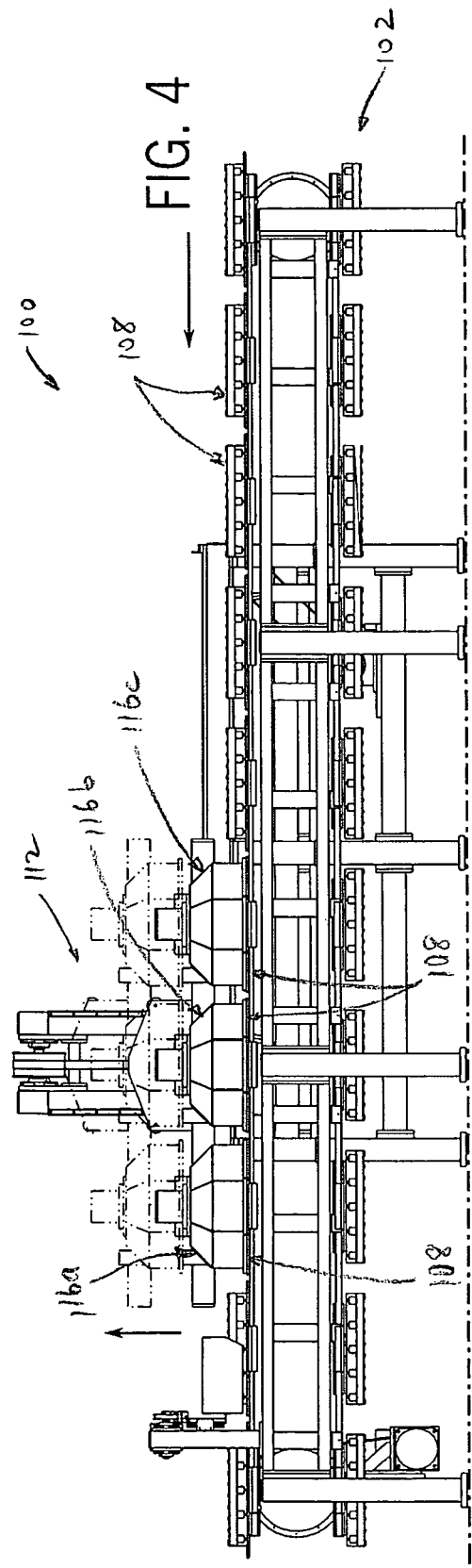

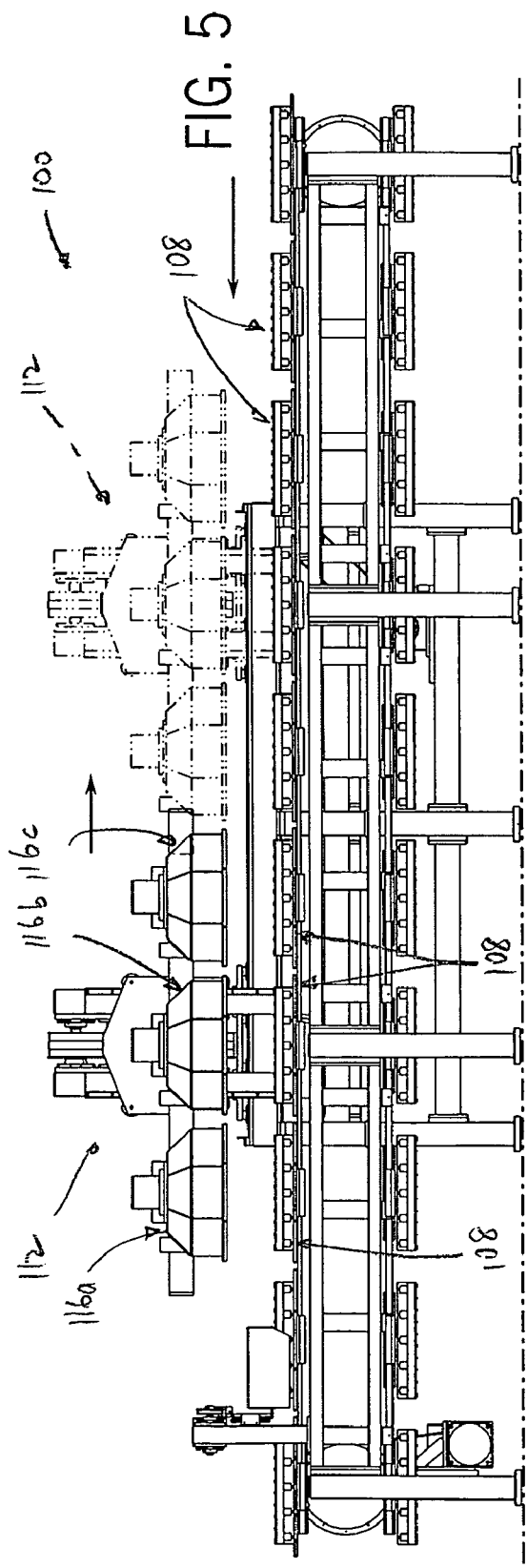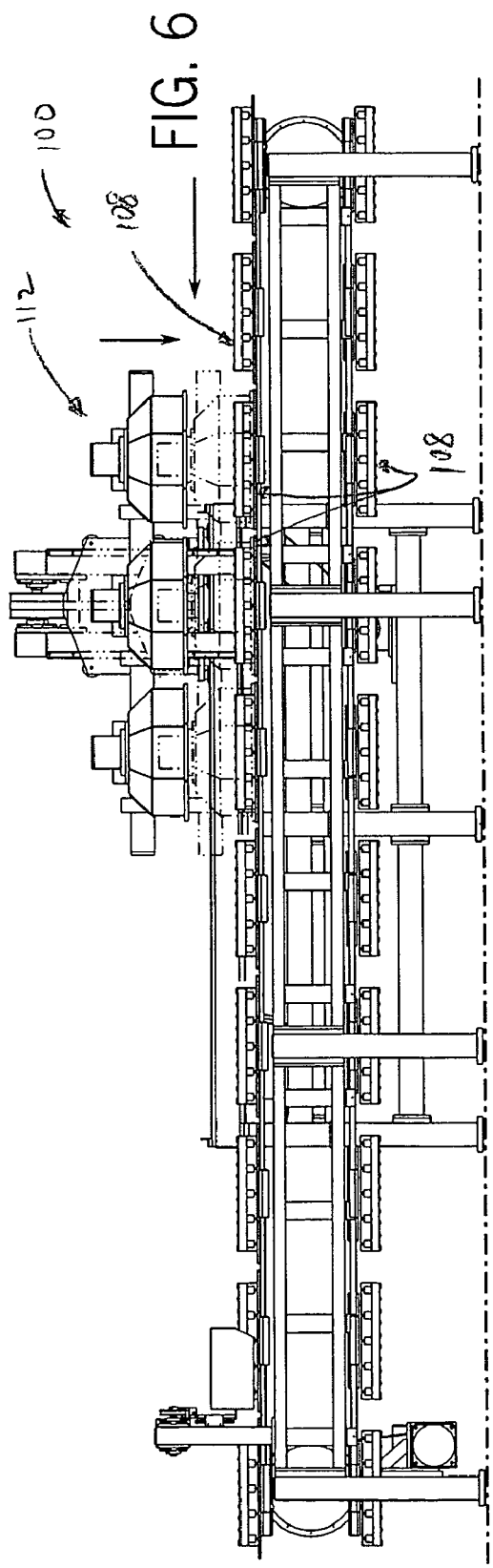

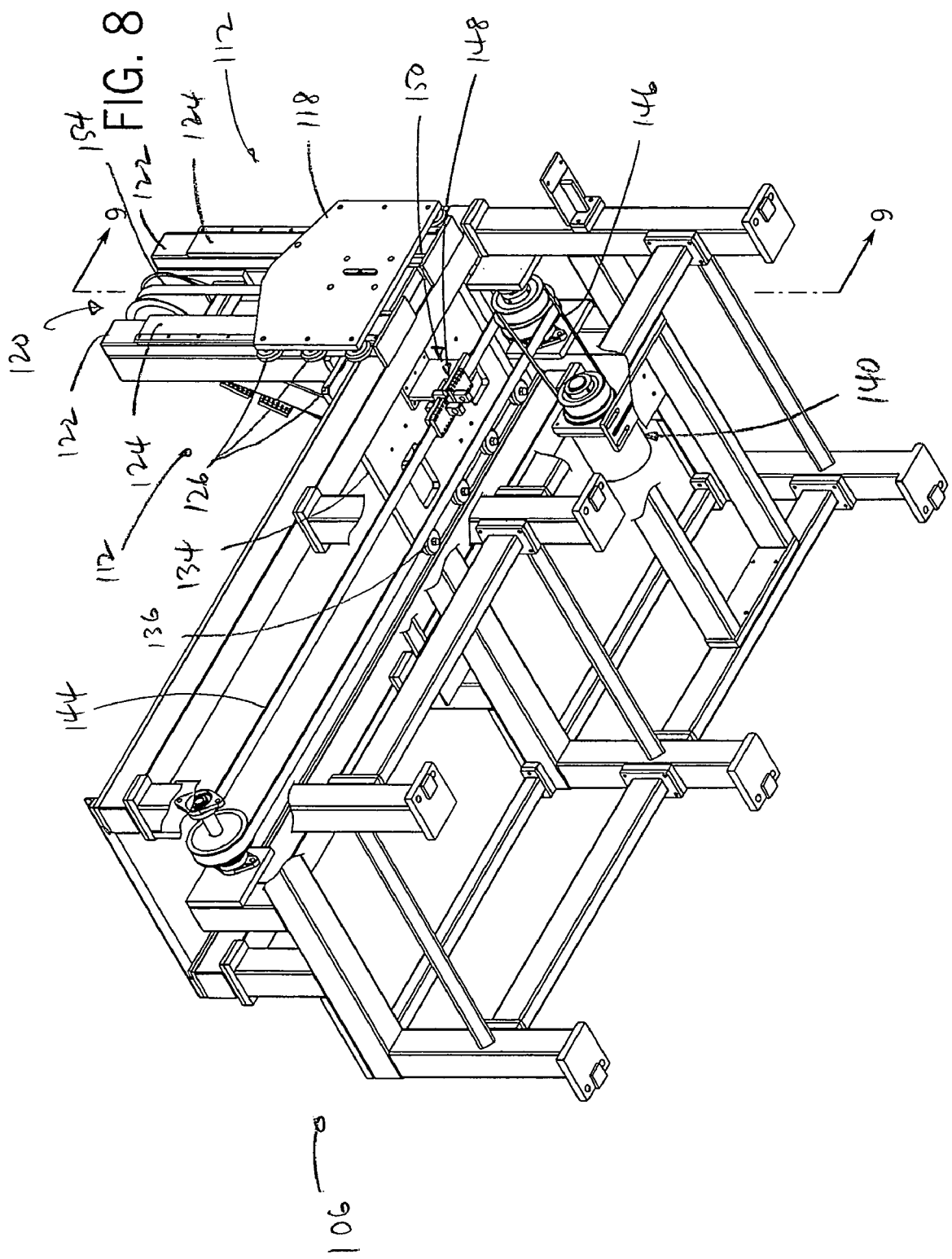

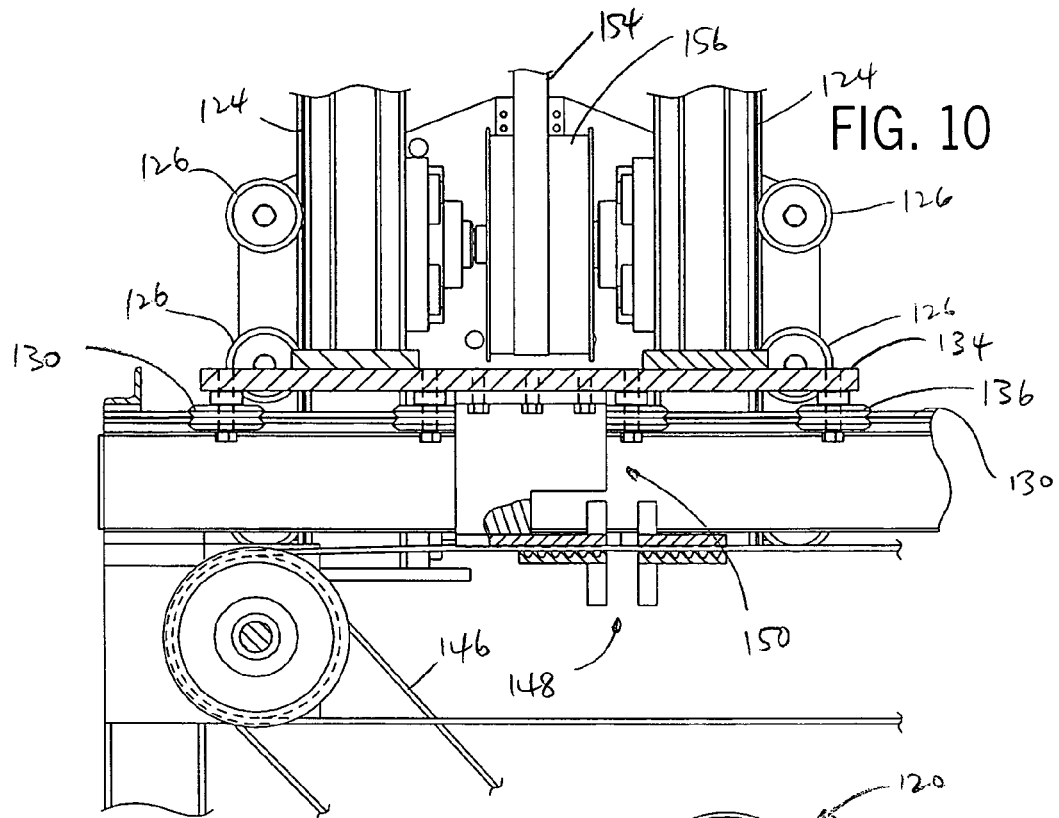
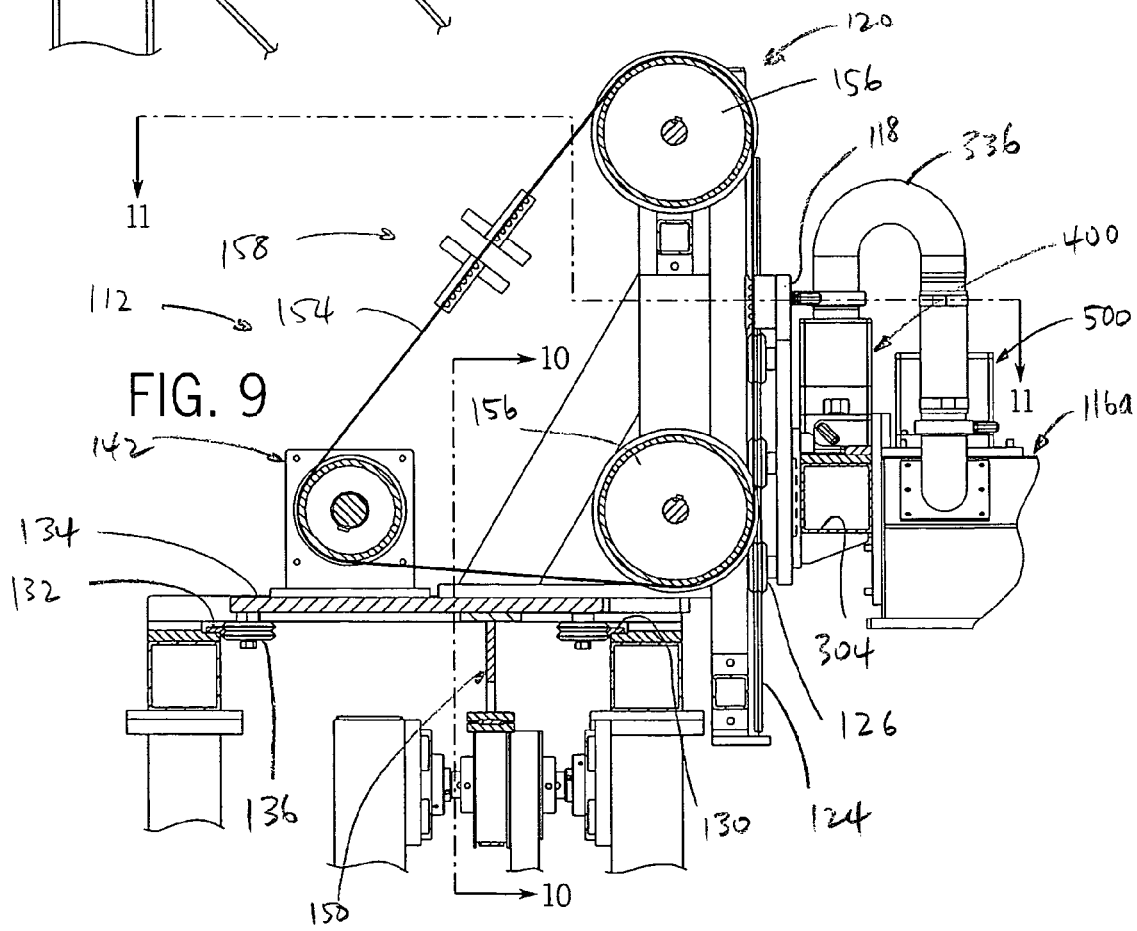

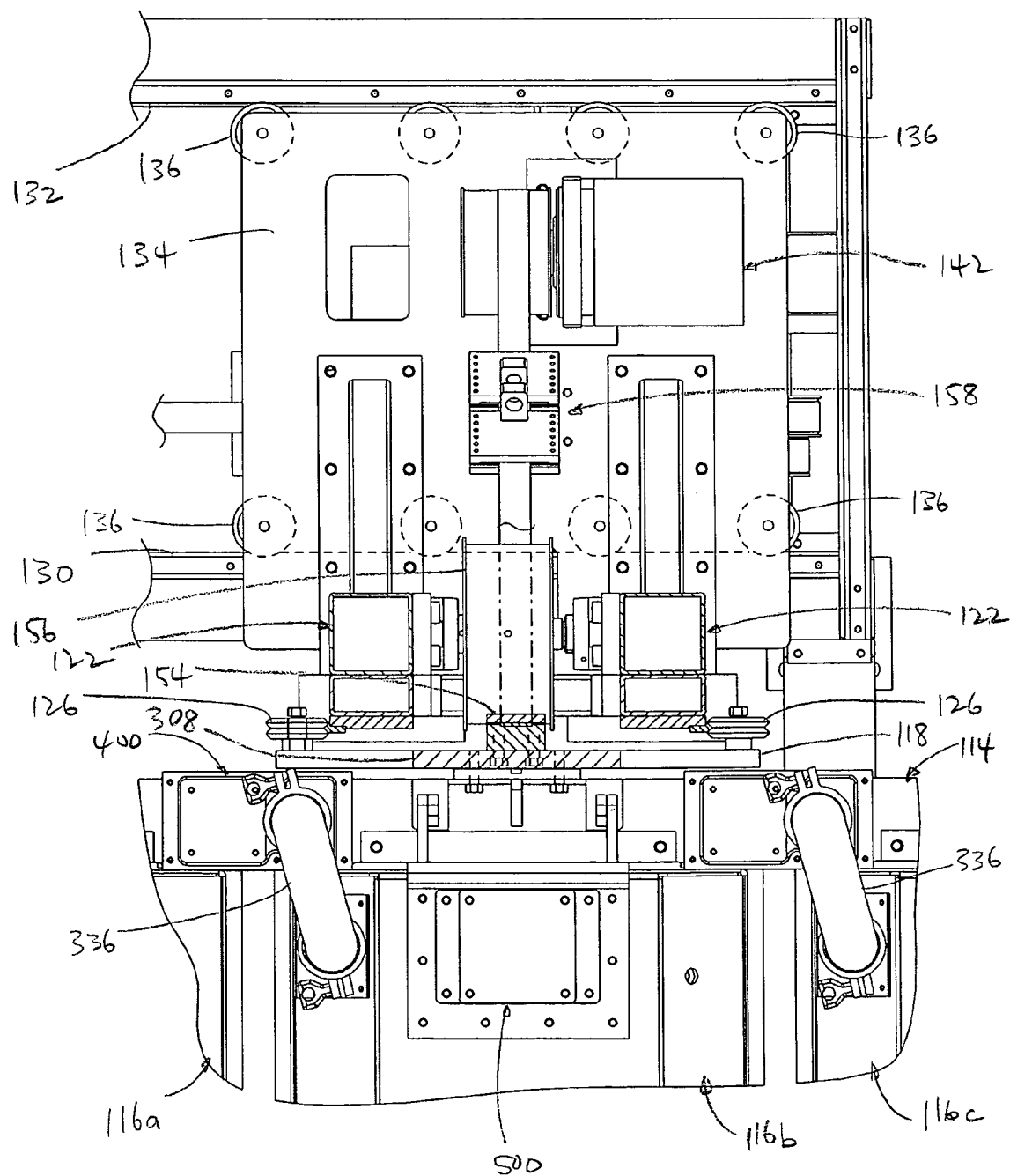

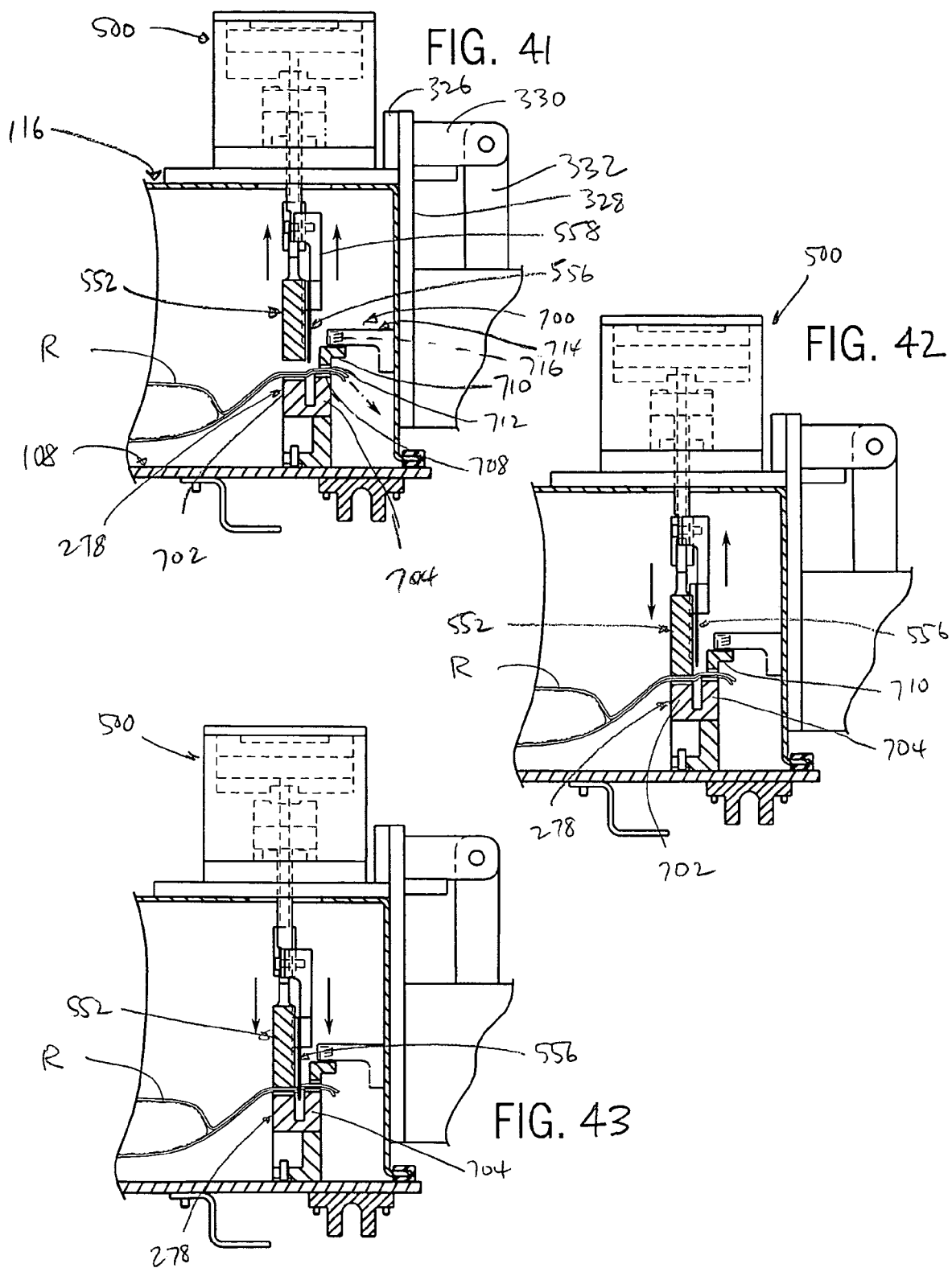

US 7,575,114 B2

CONVEYOR BELT CONSTRUCTION FOR A PLATEN-TYPE CONVEYOR

CROSS REFERENCE TO RELATED APPLICATIONS

This application claims the benefit of provisional application Ser. No. 60/625,304 filed Nov. 5, 2004.

BACKGROUND AND SUMMARY OF THE INVENTION

This invention relates to a conveyor belt construction for use in a conveyor having individual conveying members, such as a platen-type conveyor for use in a vacuum packaging apparatus.

A conveyor with individual conveying members, such as platens, typically utilizes a chain or the like that carries the conveying members. While this construction provides satisfactory operation, use of a chain in a conveyor results in certain drawbacks. For example, a chain will stretch over time due to wear in the components of the chain, which detracts from performance and requires periodic maintenance. Conveyor belts have been developed that eliminate belt stretch, typically by incorporating flexible, non-stretchable materials such as Kevlar®. However, a conveyor belt typically requires the use of a belt tensioner to tighten the belt onto the rotatable members of the conveyor. Furthermore, there is not a known satisfactory means for mounting individual conveying members to a conveyor belt.

It is an object of the present invention to provide a conveyor belt construction, for use in a conveyor with individual conveying members, which eliminates the use of a tensioner to tighten the belt onto the rotatable members of the conveyor. It is a further object of the invention to provide such a conveyor belt construction that incorporates a mounting arrangement for securing individual conveying members to the conveyor belt. It is another object of the invention to provide a conveyor having a belt with individual conveying members, such as platens. Yet another object of the invention is to provide a conveyor belt construction that is relatively simple in its components and assembly, yet which provides an efficient means for tightening the belt onto the rotatable members of the conveyor and for mounting the individual conveying members onto the belt.

In accordance with the present invention, a conveyor belt construction includes a flexible conveyor belt defining first and second oppositely facing surfaces, a first clamp member defining an arcuate belt engaging area with which the first surface of the flexible conveyor belt is engaged, and a second clamp member defining an arcuate belt engaging area with which the second surface of the flexible conveyor belt is engaged. The arcuate area of one of the first and second clamp members is concave and the arcuate area of the other of the first and second clamp members is convex. The first and second clamp members are secured together and the belt is sandwiched between the concave and convex areas of the first and second clamp members. A series of sets of first and second clamp members secured together at spaced intervals along the length of the flexible conveyor belt. The conveyor belt construction is engaged with a pair of rotatable members, and the concave and convex areas of the first and second clamp members of each set of clamp members function to take up a length of the flexible conveyor belt so as to tighten the flexible conveyor belt onto the pair of rotatable members without the use of a belt tensioner.

One of the first and second clamp members is in the form of an outer clamp member, and the other of the first and second clamp members is in the form of an inner clamp member. A conveying member is mounted to an outer one of the first and second clamp members. Representatively, each conveying member may be in the form of a platen defining an outwardly facing surface adapted to support an article to be conveyed.

Engagement structure may be interposed between each inner clamp member and the inner surface of the conveyor belt with which the inner clamp member is engaged. Representatively, the engagement structure may be in the form of a series of transverse ridges and grooves on the inner surface of the conveyor belt along the length of the conveyor belt, and a series of mating transverse ridges and grooves on the arcuate area of the inner clamp member that engage the ridges and grooves on the inner surface of the conveyor belt.

The invention also contemplates a conveyor having a conveyor belt construction in accordance with the foregoing summary, and a method of tightening a conveyor belt onto rotatable members associated with a conveyor, also in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIGS. 3-6 are sequential front elevation views illustrating operation of the vacuum packaging system of FIG. 1;

FIG. 8 is a bottom front isometric view of the support frame and carriage shown in FIG. 7;

FIG. 9 is a partial section view taken along line 9-9 of FIG. 8;

FIG. 10 is a partial section view taken along line 10-10 of FIG. 9;

FIG. 11 is a partial section view taken along line 11-11 of FIG. 9;

FIG. 41 is a section view, with reference to line 41-41 of FIG. 36, showing the cylinder in the neutral position of FIG. 38;

FIG. 42 is a view similar to FIG. 41, showing the cylinder in the position of FIG. 37; and FIG. 43 is a view similar to FIGS. 41 and 42, showing the cylinder in the position of FIG. 38.

DETAILED DESCRIPTION OF THE INVENTION
OVERALL SYSTEM

Figure 1:
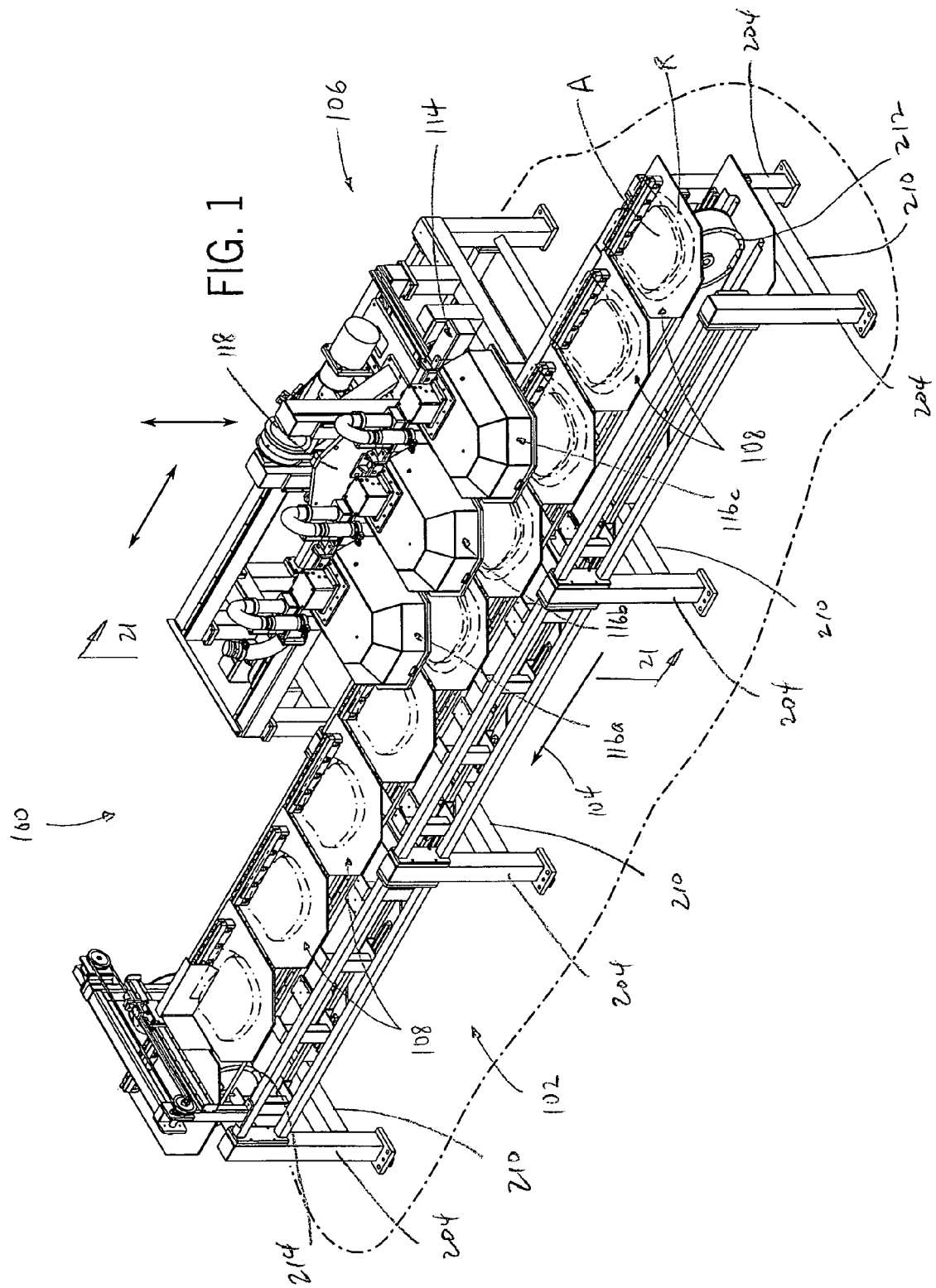
FIG. 1 is an isometric view of a linear motion, reciprocating vacuum packaging system in accordance with the present invention.
Figure 2:
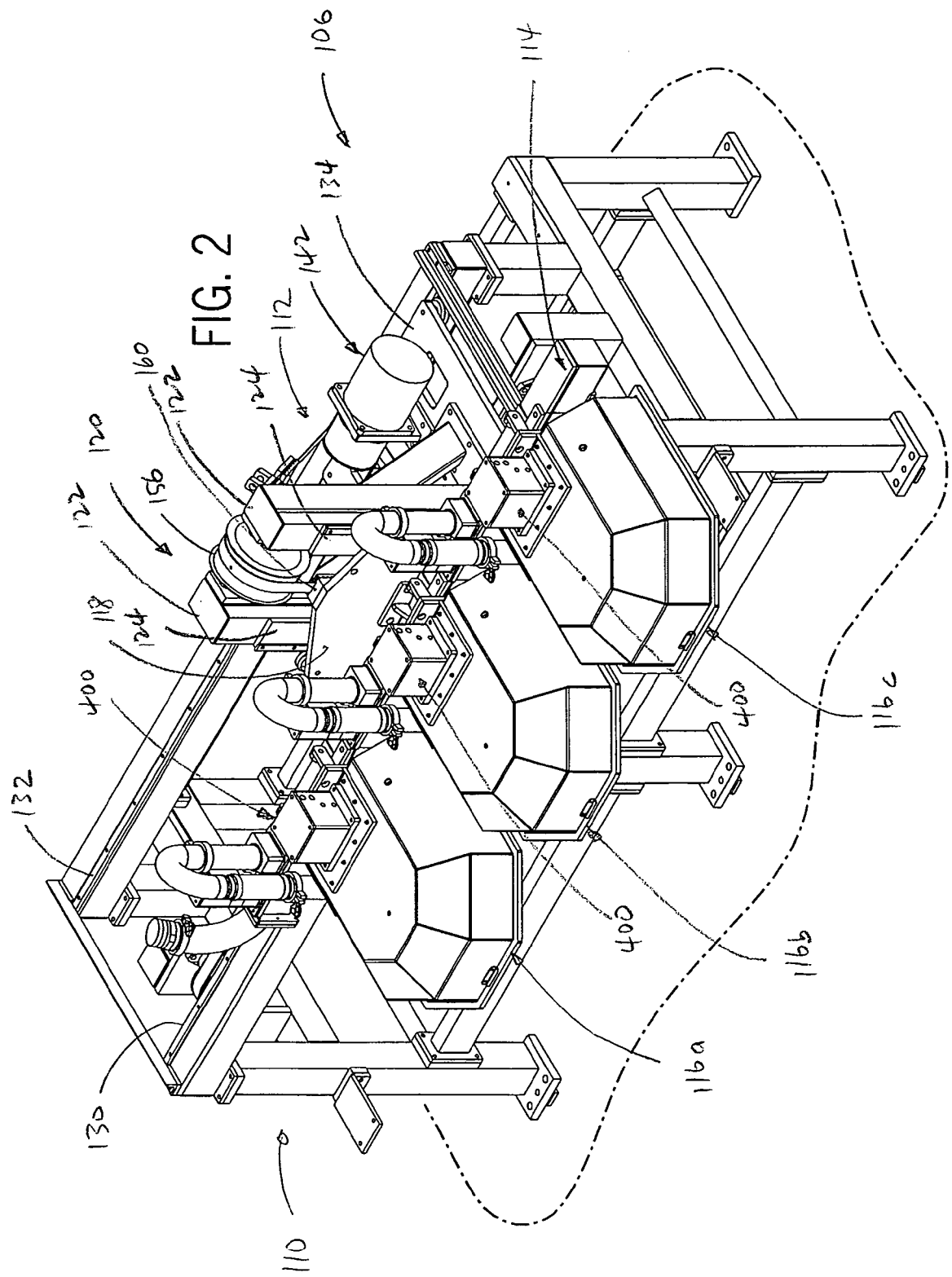
FIG. 2 is an isometric view of a linear motion, reciprocating evacuation system incorporated in the vacuum packaging system of FIG. 1.
Figure 7:
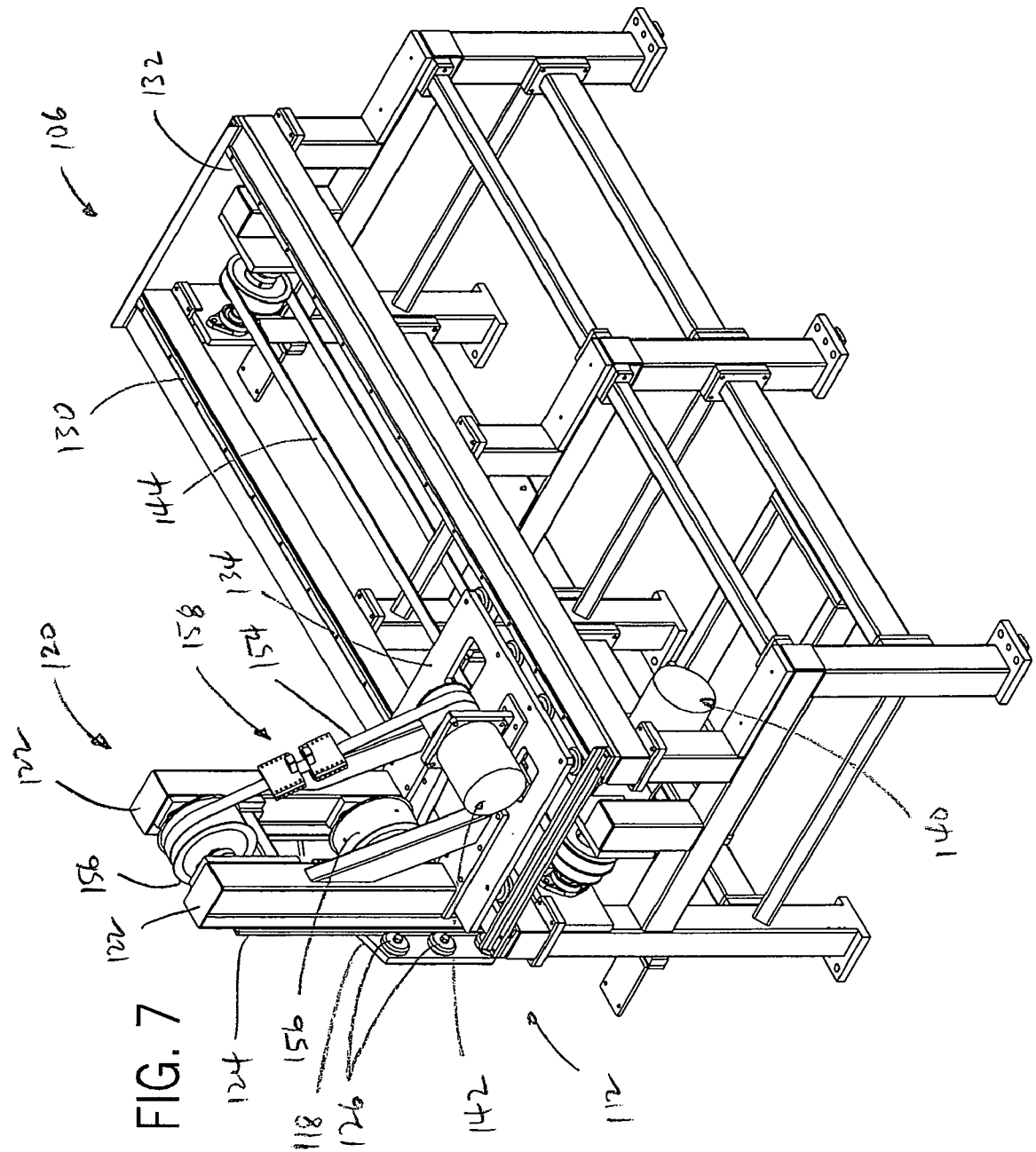
FIG. 7 is a rear isometric view of a support frame and carriage assembly incorporated in the evacuation system of FIG. 2.
Figure 12:
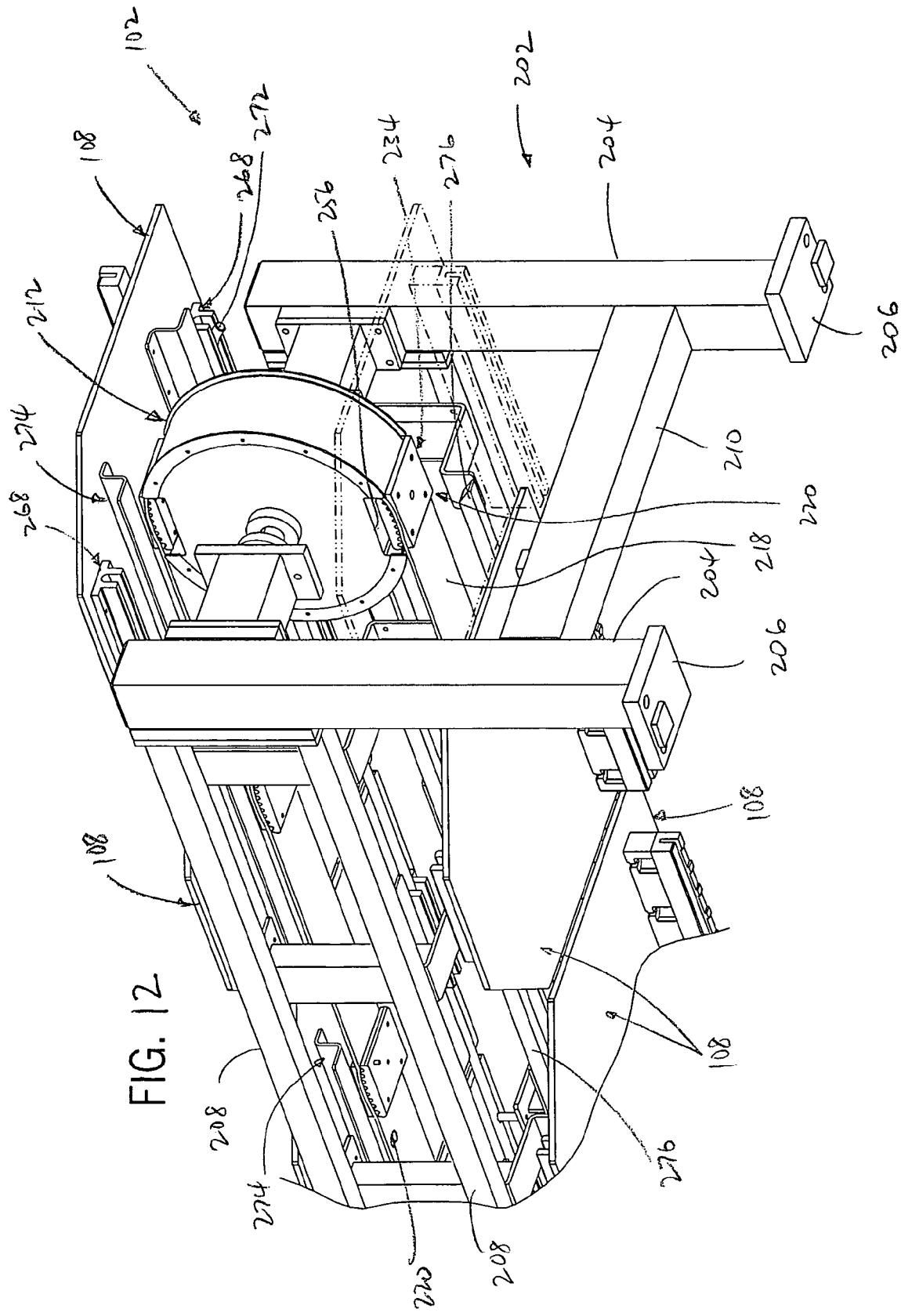
FIG. 12 is a partial isometric view showing a portion of an article conveyor incorporated in the vacuum packaging system of FIG. 1.

Referring to FIGS. 1 and 2, a linear motion reciprocating vacuum packaging system in accordance with the present invention is shown at 100. Generally, vacuum packaging system 100 includes a conveyor 102 that advances items to be packaged along the length of the vacuum packaging system 100 in a linear primary path of travel, denoted by arrow 104. Vacuum packaging system 100 further includes an evacuation arrangement shown generally at 106, which cooperates with conveyor 102 to evacuate and seal the items to be packaged as the items are conveyed by conveyor 102.

Conveyor 102 includes a series of platens 108, each of which is adapted to receive and support an article A contained within a receptacle R. Article A may be any article that is suitable for vacuum packaging, e.g. a perishable food product such as meat, cheese, etc. Receptacle R may be any satisfactory open-ended receptacle sized to receive article A and suitable for use in vacuum packaging, as is known in the prior art. Conveyor 102 may be configured to advance incrementally at spaced intervals in an indexing fashion, or may be configured to provide continuous advancement of items supported by conveyor 102, either at a continuous rate of speed or at variable rates of speed. In a manner to be explained, the platens 108 are advanced by conveyor 102 and cooperate with evacuation arrangement 106 to evacuate and seal receptacle R about article A.

FIGS. 2-11 illustrate the construction of evacuation arrangement 106, which is positioned adjacent conveyor 102. Generally, evacuation arrangement 106 includes a stationary support frame 110 configured to support a movable carriage assembly 112. The carriage assembly 112 includes a horizontally extending vacuum chamber support beam 114. Attached to the support beam 114 are three identical vacuum chambers 116a-c. Carriage assembly 112 includes a forwardly facing mounting plate 118 that is secured to a central region of the support beam 114, and which is slidably engaged with a vertical mast 120 that forms a part of carriage assembly 112. Mast 120 includes a pair of laterally spaced vertical support members 122, and a vertical slide rail 124 is mounted to the forwardly facing surface of each vertical support member 122. As shown in FIG. 8, a series of vertically spaced grooved rollers 126 are mounted to the side areas of mounting plate 118, and each set of grooved rollers is engaged with the outer edge of one of vertical slide rails 124. With this arrangement, mounting plate 118 is vertically movable on mast 120, which enables vertical movement of support beam 114, and thereby vacuum chambers 116a-c, on mast 120.

Support frame 110 includes a horizontal front rail 130 and horizontal rear rail 132 mounted to respective horizontal front and rear structural members support frame 110. Carriage assembly 112 includes a horizontal slide plate 134, which includes front and rear sets of horizontally spaced grooved guide rollers 136. The front set of guide rollers 136 are engaged with front rail 130, and the rear set of guide rollers 136 are engaged with rear rail 132, so as to movably mount carriage assembly 112 to support frame 110 for horizontal linear movement of the carriage assembly 112 and the attached support beam 114. The evacuation arrangement 106 is arranged such that the linear movement of carriage assembly 112 is substantially parallel to the linear movement of the conveyor 102.

The vacuum packaging system 100 includes two prime movers, which may be in the form of electric servo motors 140, 142, that provide respective linear horizontal and vertical movement of the carriage assembly 112 on support frame 110. Servo motor 140 is attached to the base of the support frame 110, and is engaged with a horizontal drive belt 144 to actuate the horizontal movement of the carriage assembly 112 along the rails 130 and 132. Servo motor 140 includes an output member that drives horizontal drive belt 144 to which carriage 112 is mounted, through any satisfactory drive arrangement such as a chain, belt or gear-type power transfer arrangement. In the illustrated embodiment, the output of servo motor 140 is engaged with horizontal drive belt 144 through a transfer belt 146. A belt tensioner 148 connects the ends of horizontal drive belt 144, and horizontal slide plate 134 is engaged with horizontal drive belt 144 in any satisfactory manner, such as by a coupling member 150, which depends from the underside of horizontal slide plate 134 and is engaged in any satisfactory manner with drive belt 144. With this construction, operation of servo motor 140 functions to impart linear motion to the upper run of horizontal drive belt 144, which is transferred through coupling member 150 to horizontal slide plate 134 of carriage assembly 112. Slide plate 134 is thus moved horizontally along rails 130 and 132, which functions to move support beam 114 and vacuum heads 116a-c along with carriage assembly 112 relative to support frame 110. For reasons to be explained, servo motor 140 is operated first in one direction and then in the opposite direction, to provide reciprocating horizontal movement of carriage assembly 112 on support frame 110.

Servo motor 142 is mounted to the upwardly facing surface of slide plate 134, and is engaged with a vertical drive belt 154 to actuate the vertical movement of the mounting plate 118 along the vertical support members 122 of mast 120. Servo motor 142 includes an output member that drives vertical drive belt 154 to which mounting plate 118 is mounted, through any satisfactory drive arrangement such as a chain, belt or gear-type power transfer arrangement. In the illustrated embodiment, the output of servo motor 142 is engaged directly with vertical drive belt 154, and vertical drive belt 154 is engaged with vertically spaced idler wheels 156 that are rotatably mounted between vertical support members 122 of mast 120. A belt tensioner 158 connects the ends of vertical drive belt 154, and mounting plate 118 is engaged with vertical drive belt 154 in any satisfactory manner, such as by a coupling member 160, which extends from the rear of vertical mounting plate 118 and is engaged in any satisfactory manner with drive belt 158. With this construction, operation of servo motor 142 functions to impart linear motion to the forward run of vertical drive belt 154, which is transferred through coupling member 160 to vertical mounting plate 118 of carriage assembly 112. Vertical mounting plate 118 is thus moved vertically along rails 124, which functions to move support beam 114 and vacuum heads 116a-c vertically on carriage assembly 112. For reasons to be explained, servo motor 142 is operated first in one direction and then in the opposite direction, to provide reciprocating vertical movement of mounting plate 118 on carriage assembly 112.

Although a preferred carriage assembly 112 is generally as shown and described, it is understood that any other satisfactory carriage assembly may be utilized that provides suitable linear horizontal and vertical movement of the vacuum chambers 116a-c in relation to the conveyor 102 consistent with the disclosed vacuum packaging system 100.

The vacuum chambers 116a-c are arranged and spaced apart on the support beam 114 of the carriage assembly 112 such that all of the individual vacuum chambers 116a, 116b, 116c are moved linearly and vertically as a single unit. Vacuum chambers 116a-c are spaced apart from each other at the same spacing as conveyor platens 108. The carriage assembly 112 and vacuum chambers 116a-c are arranged such that when the carriage assembly support beam 114 is lowered to place the vacuum chambers 116a-c in position to merge and engage with a platen 108 on the conveyor 102, each individual vacuum chamber 116a, 116b, 116c engages a separate platen 108.

As will be explained, each individual vacuum chamber 116a-c includes a vacuum tube assembly to remove air, a seal bar to seal the receptacle R, and a knife to cut the excess material of receptacle R after sealing.

Conveyor

FIGS. 12-20 illustrate the construction of platen conveyor 102, which includes platens 108. Platen conveyor 102 includes a conventional support frame 202 having a series of vertically extending legs 204 attached to feet 206 at their lower ends. Outer horizontal support beams 208 extend longitudinally between legs 204, and cross beams 210 extend transversely between legs 204. An upstream pulley 212 and a downstream pulley 214 are rotatably supported by frame 202. A prime mover, such as a conveyor drive servo motor 216 (FIG. 3), is drivingly engaged with one of the pulleys, such as downstream pulley 214, to impart movement to conveyor 102 in a manner to be explained.

A conveyor belt 218 is engaged about upstream pulley 212 and downstream pulley 214. Belt 218 is wrapped around pulleys 212, 214, and platens 108 are attached to belt 218 via clamp assemblies 220.

Conveyor belt 218 is generally known in the art and includes a flat outer side 222, and a grooved or ribbed inner side 224. The inner side 224 has a series of sequential alternating spaced ridges 226 and grooves 228. Belt 218 may be comprised of a single section, or may be spliced into a number of sections, e.g. three sections. At predetermined locations along its length, belt 218 includes a set of fastener holes 230 at each location at which a clamp assembly 220 is to be secured to the belt 218. In the illustrated embodiment, five fastener holes 230 are drilled in each predrilled set and are arranged in a generally rectangular configuration to align with fastener receiving holes of the clamp assembly 220.

In order to place belt 218 onto the conveyor 226, belt 218 is laid around the pulleys 212, 214. If desired, belt 218 may be in a number of sections to accommodate handling of the belt. In a spliced belt 218, the spliced sections are first connected using the clamp assemblies 220 as will be discussed in greater detail below. Following assembly of the belt 218, the belt is laid around the pulleys 94, 96.

Regardless of whether a multi-section belt or a single section belt is utilized, there is initially a substantial amount of slack in the belt 218 when the belt is placed around pulleys 212, 214. This slack in the belt 218 is useful in enabling the belt 218 to be placed onto the pulleys 212, 214. In order to tighten the attached belt 218 around the pulleys 212, 214, multiple sequential clamp assemblies 220 are attached to the belt 218. As will be discussed in greater detail below, as each clamp assembly 220 is attached, the overall effective length of belt 218 is shortened, to tighten belt 218 around the pulleys 94, 96. Clamp assemblies 220, therefore, allow the belt 218 to be tightened to the conveyor 226, without the need for a belt tensioner that may otherwise be required.

Figure 18:
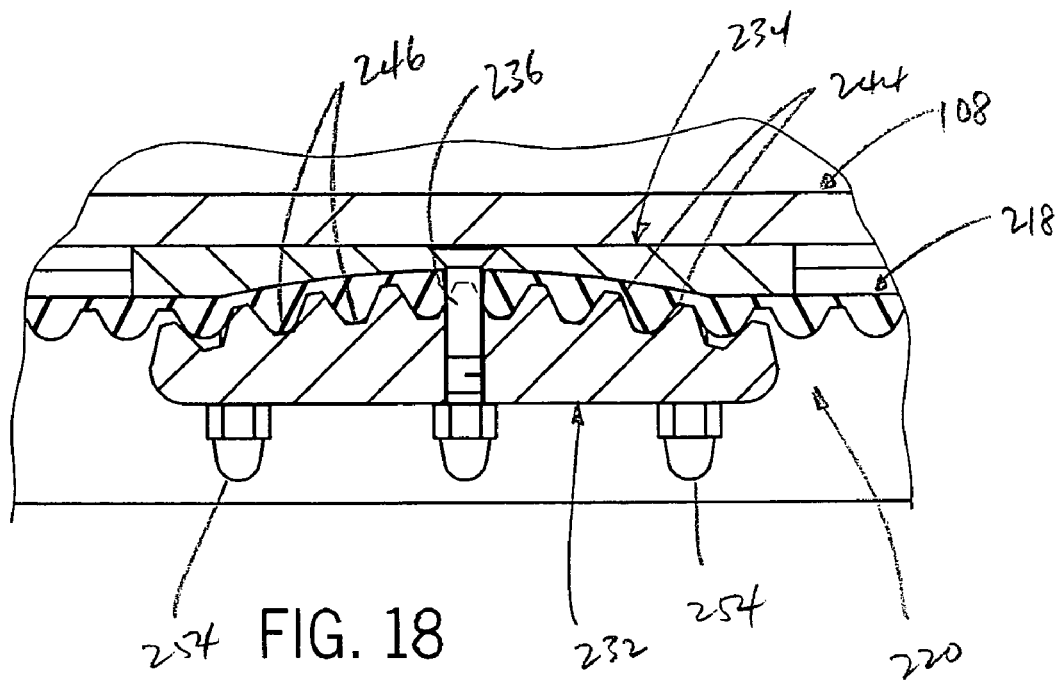
FIG. 18 is an enlarged partial section view, with reference to line 18-18 of FIG. 17.

As best illustrated in FIGS. 14-18, each clamp assembly 220 includes a lower clamp member 232 and an upper clamp member 234 joined by threaded fasteners 236. Inner clamp member 232 is a generally rectangular member with a series of spaced fastener receiving holes 238. As noted above, fastener receiving holes 238 are configured to align with the predrilled fastener receiving holes 230 formed in belt 218. Inner clamp member 232 is configured for attachment to the inner side 224 of belt 218. The outer side 240 of inner clamp member 232 is preferably flat. The inner side 242 of inner clamp member 232 defines a series of parallel alternating ridges 244 and grooves 246. Outer clamp ridges 244 and grooves 246 are configured to mate with the ridges 226 and grooves 228 of the belt 218. In addition, inner side 242 defines a generally curved or arcuate surface. As illustrated in FIG. 18, the peak of the center ridge 224 defines the greatest thickness of the inner clamp member 232. The peaks of the remaining ridges 244 gradually taper in a direction toward the edges of the inner clamp member 232, thereby defining a convex curved surface.

Outer clamp member 234 is a generally rectangular member having similar dimensions as inner clamp member 232. Outer clamp member 234 includes a series of fastener receiving holes 250, which are located in alignment with the pre-drilled fastener receiving holes 230 located in belt 218 and the outer clamp fastener receiving holes 238 in inner clamp member 232. Outer clamp member 234 is configured for attachment to the outer side 222 of belt 218. Outer clamp member 234 includes a concave curved inner surface 252. Curved inner surface 252 is configured to align with and receive the curved inner side 242 of inner clamp member 232. The outer surface 254 of outer clamp member 234 is flat, and is adapted to engage the underside of a platen 108.

Figure 20:
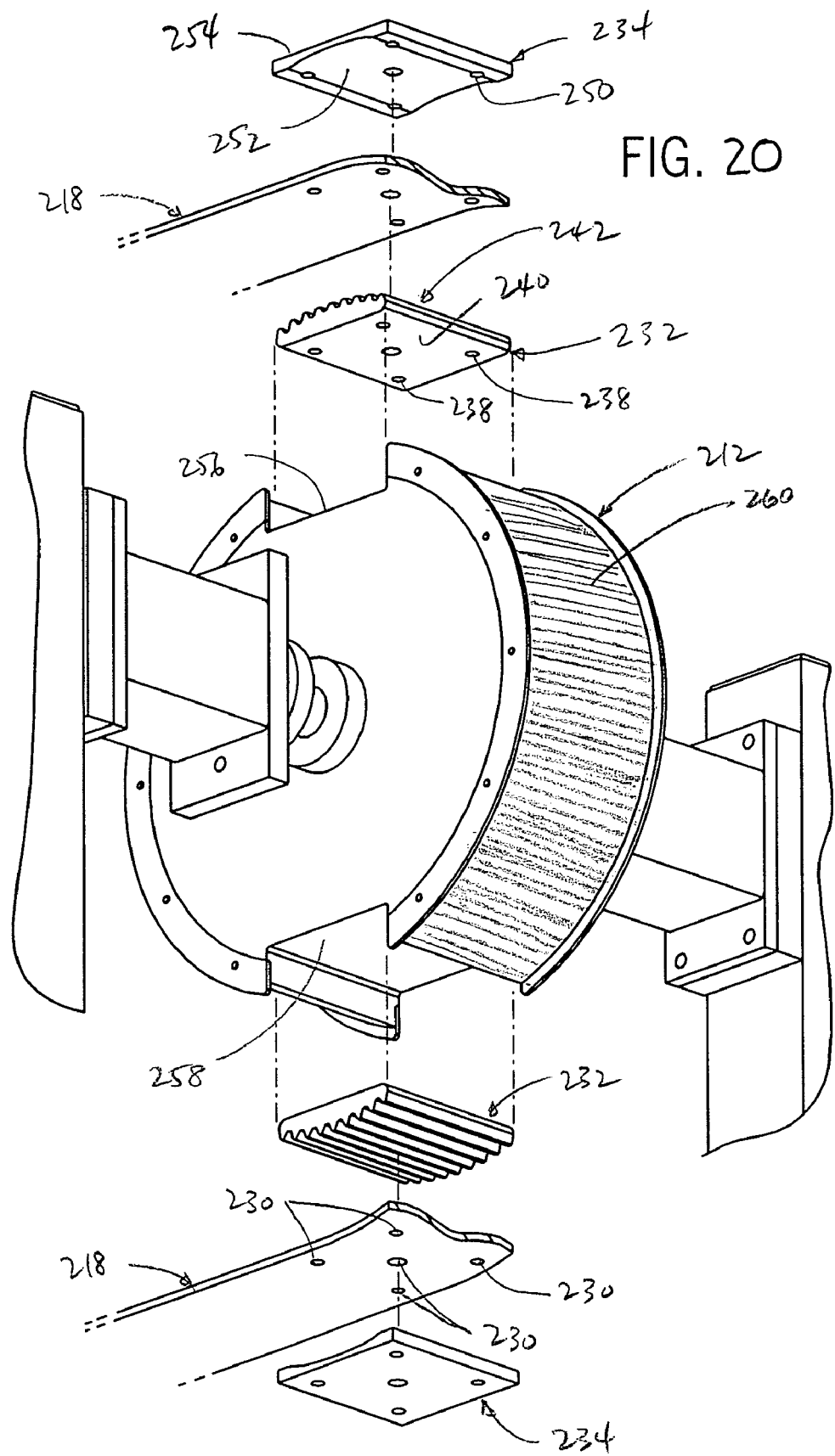
FIG. 20 is an exploded partial isometric view of the pulley and the conveyor components illustrated in FIG. 19.
Figure 21:
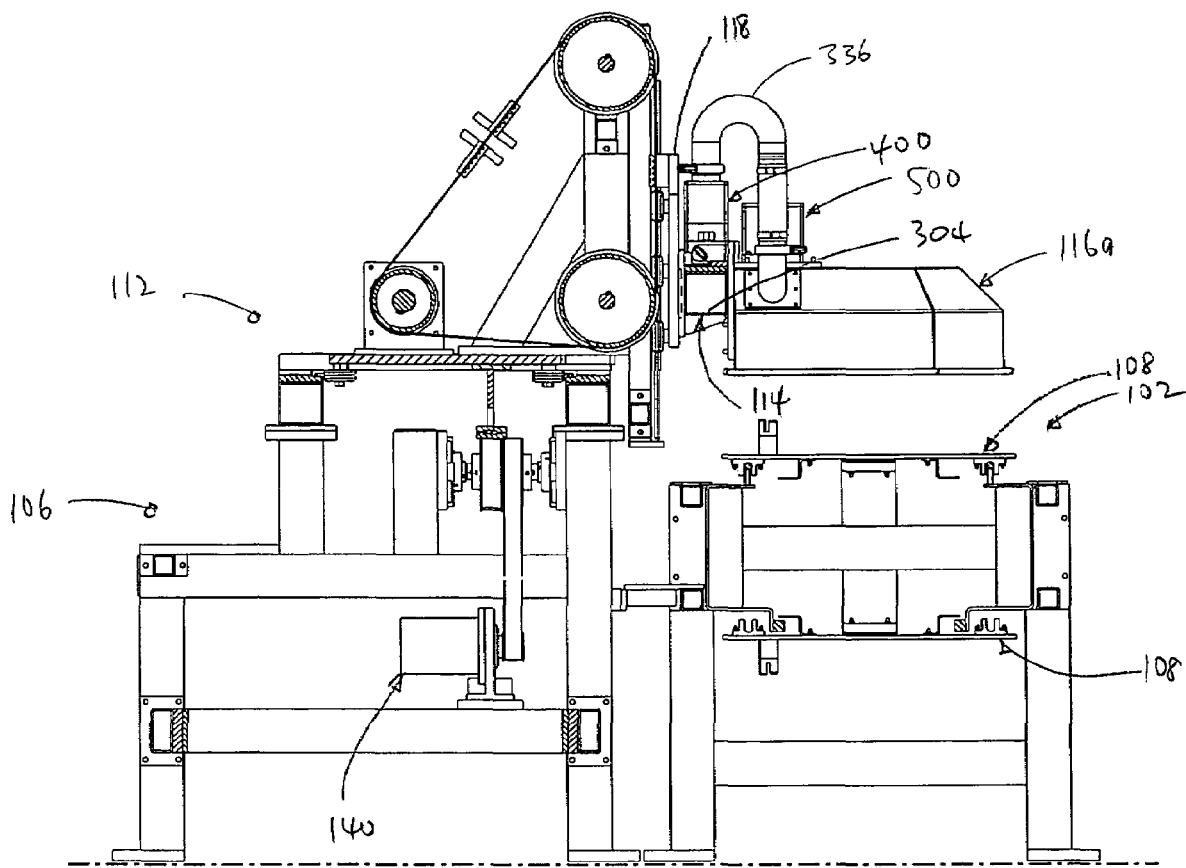
FIG. 21 is a section view taken along line 21-21 of FIG. 1.
Figure 22:
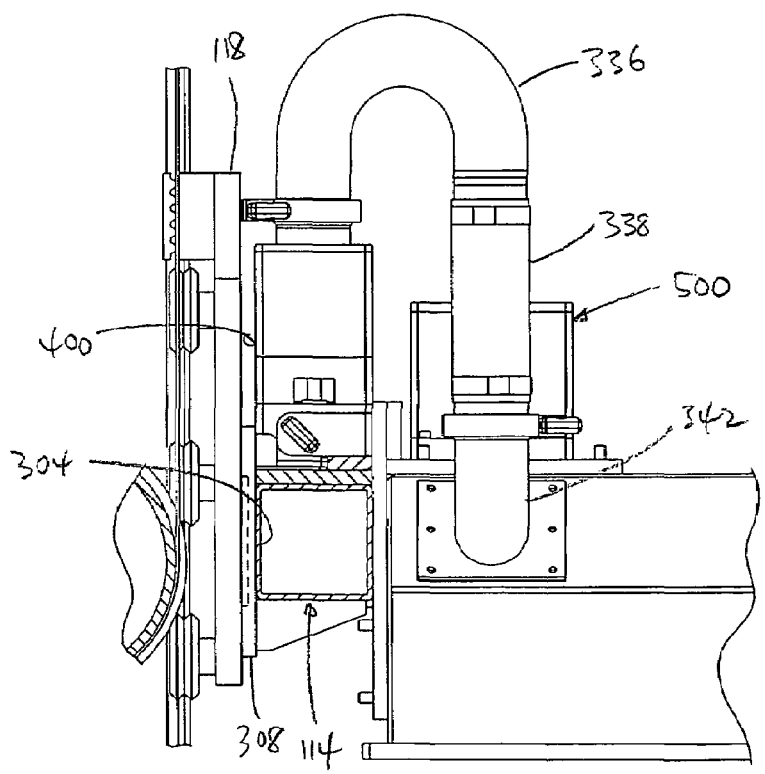
FIG. 22 is an enlarged partial section view showing a portion of the carriage and vacuum head mounting arrangement as illustrated in FIG. 21.
Figure 23:
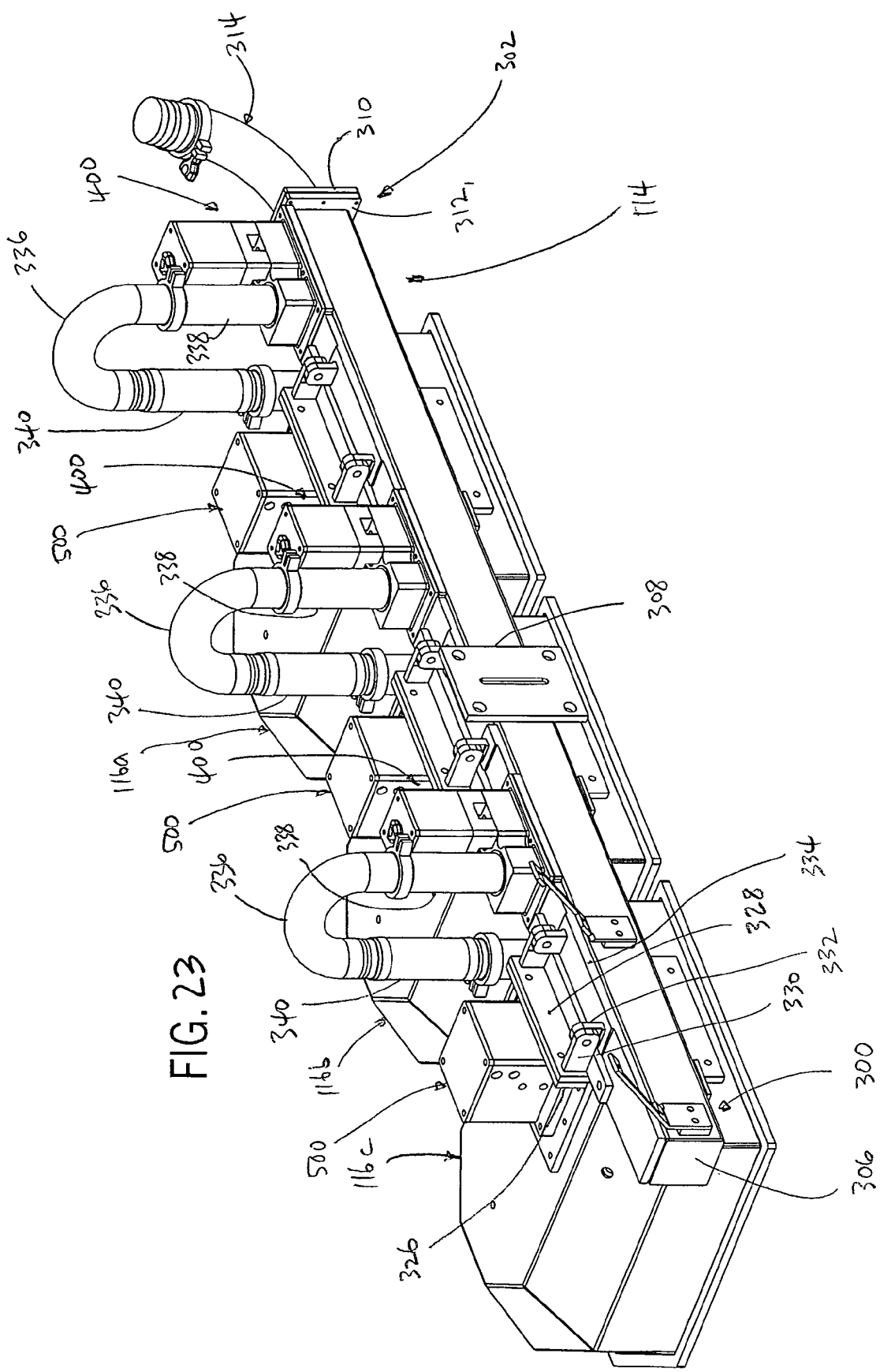
FIG. 23 is an isometric view showing a vacuum head subassembly incorporated in the evacuation system of FIG. 2.
Figure 24:
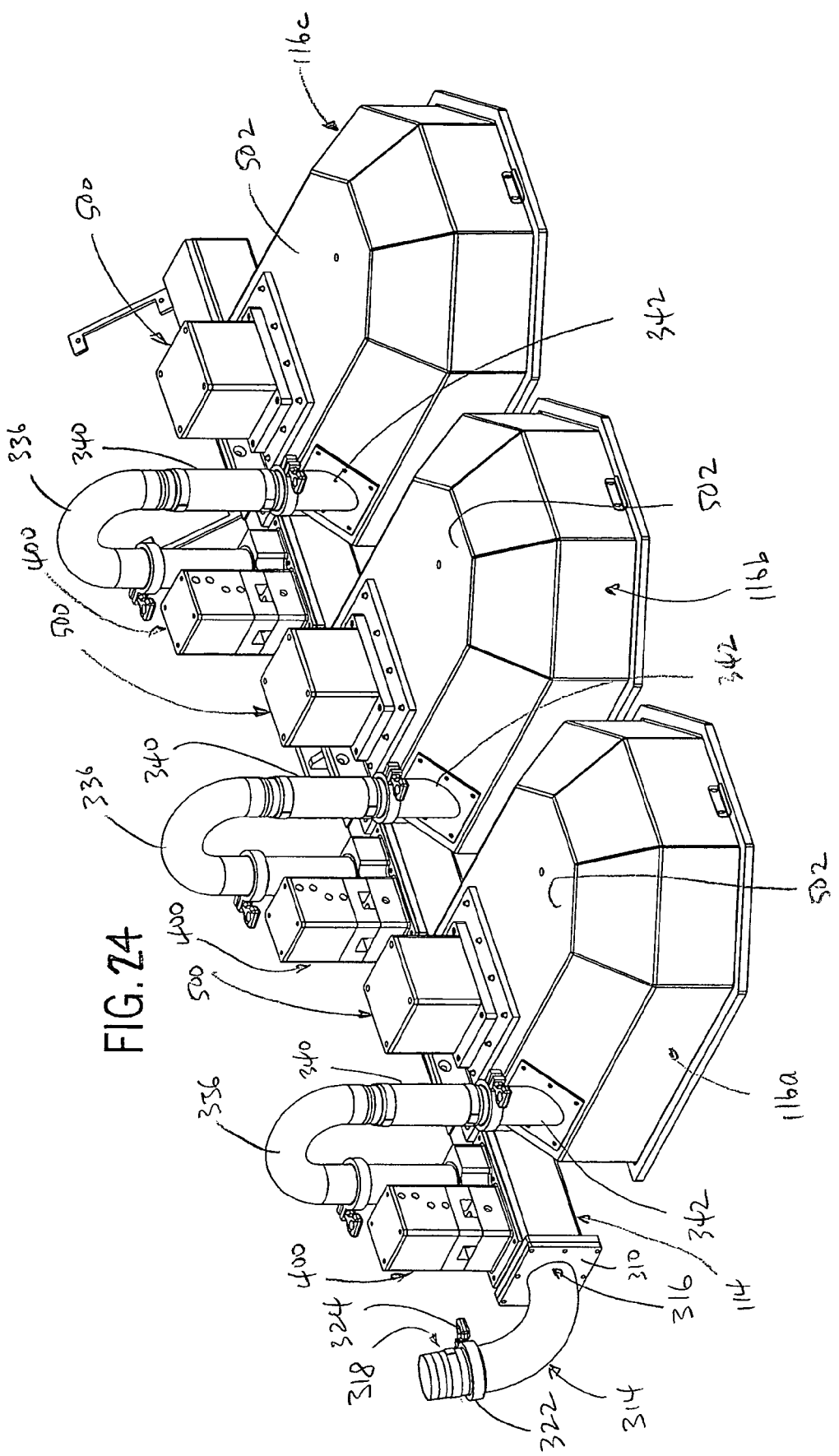
FIG. 24 is an opposite side isometric view of the vacuum head subassembly of FIG. 23.
Figure 25:
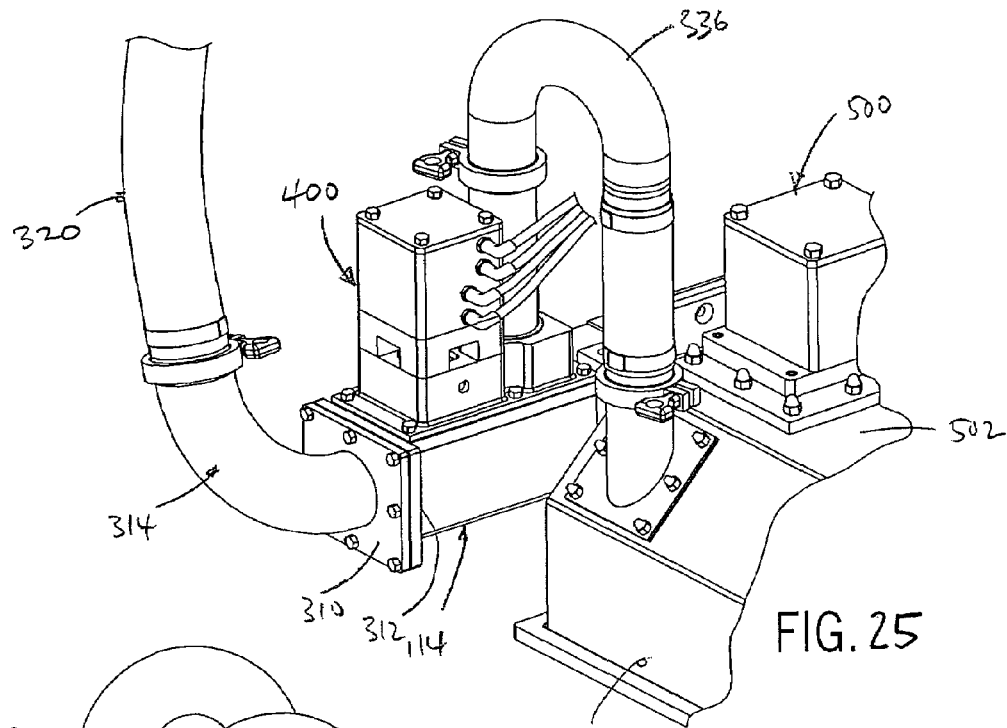
FIG. 25 is an isometric view showing an end portion of the vacuum head subassembly of FIGS. 23 and 24.
Figure 26:
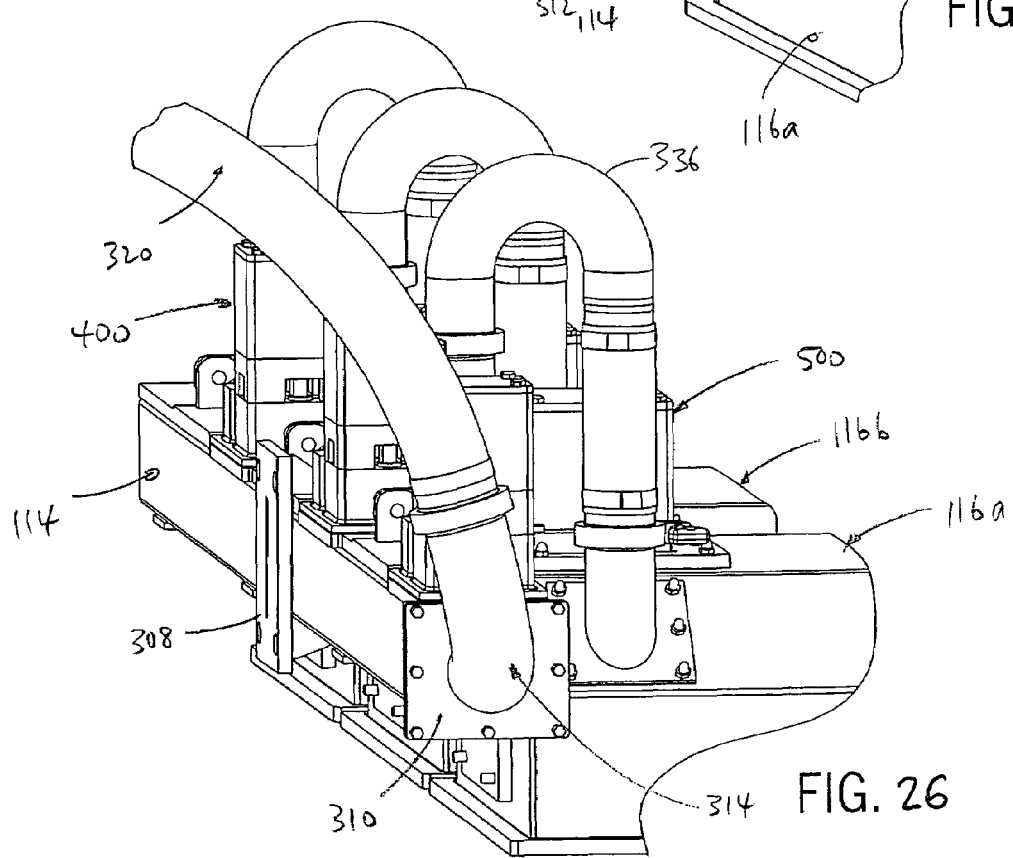
FIG. 26 is another isometric view illustrating the vacuum head subassembly of FIGS. 23 and 24.
Figure 27:
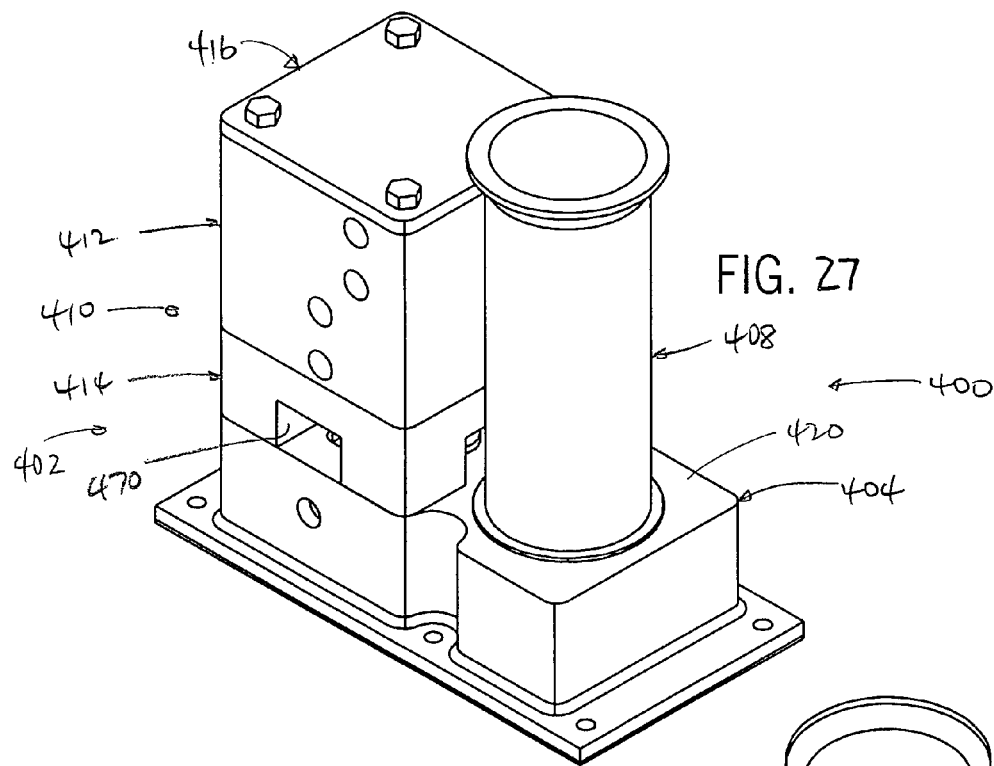
FIG. 27 is an isometric view of a two-stage vacuum valve incorporated in the vacuum head subassembly of FIG. 23.
Figure 28:
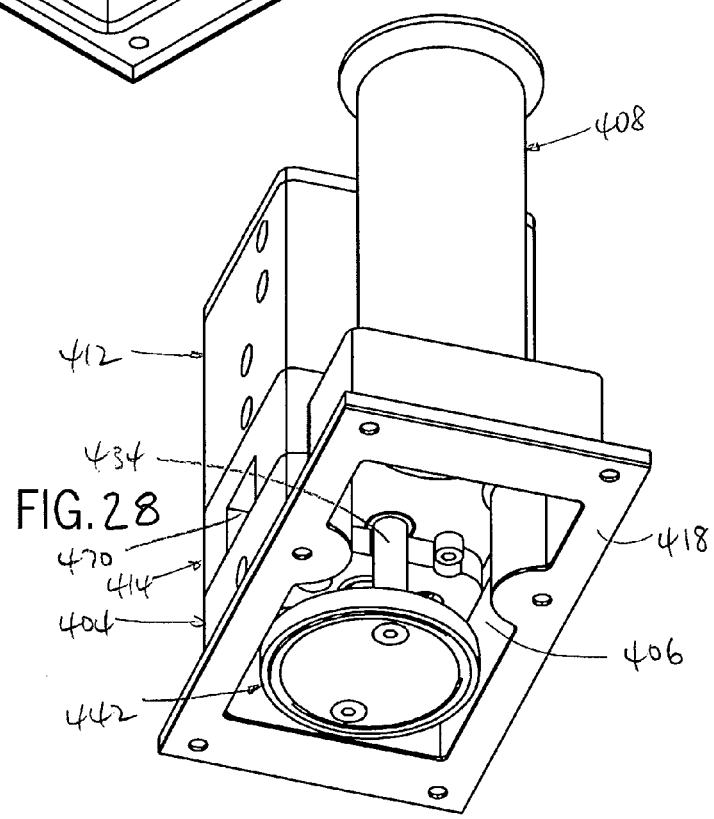
FIG. 28 is a bottom perspective view of the two stage vacuum valve of FIG. 27.
Figure 29:
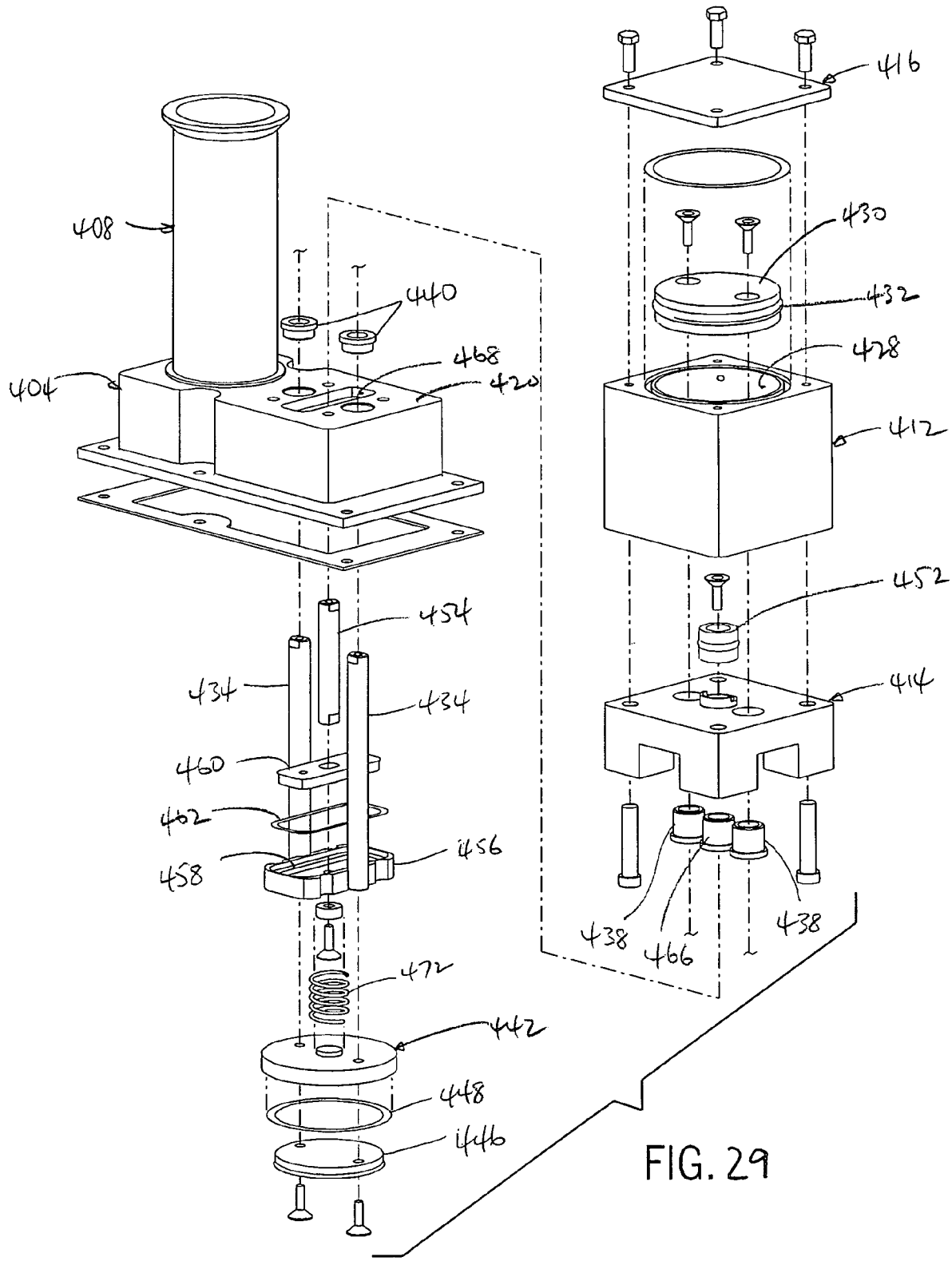
FIG. 29 is an exploded isometric view of the two stage vacuum valve of FIGS. 27 and 28.

As shown in FIGS. 18 and 20, inner clamp member 232 and outer clamp member 234 are secured together by fasteners 236. In the illustrated embodiment, fasteners 236 are inserted through the outer surface 240 of inner clamp member 232 and extend through the belt 218 and outer clamp member 234, and are engaged with nuts 254 or other similar retainer. As the fasteners 236 are inserted and tightened, the inner clamp member 232 and the outer clamp member 234 are drawn together. As the clamp members 232 and 234 move together with the belt 218 therebetween, belt 218 is sandwiched between the convex inner surface 242 of inner clamp member 232 and the concave inner surface 252 of outer clamp member 234. Due to the curved configuration of the inner surfaces of the clamp assembly 220, the engagement of each clamp assembly 220 with the belt 218 takes up a slight portion of the slack in the belt 218, since the belt 218 follows the contour of the curved inner clamp member surfaces. As a result, the belt 218 is tightened around the pulleys 212, 214. As additional clamp assemblies 220 are added, the belt 218 continues to tighten around the pulleys 212, 214. Once all of the clamp assemblies 220 have been attached to belt 218 in this manner, there is sufficient tension in the belt 218 to enable belt 218 to be driven in response to rotation of pulleys 212, 214. Thus, due to the unique configuration of clamp assemblies 220, belt 218 may be tightened onto pulleys 212, 214 without the use of a tensioner or other device.

Figure 19:
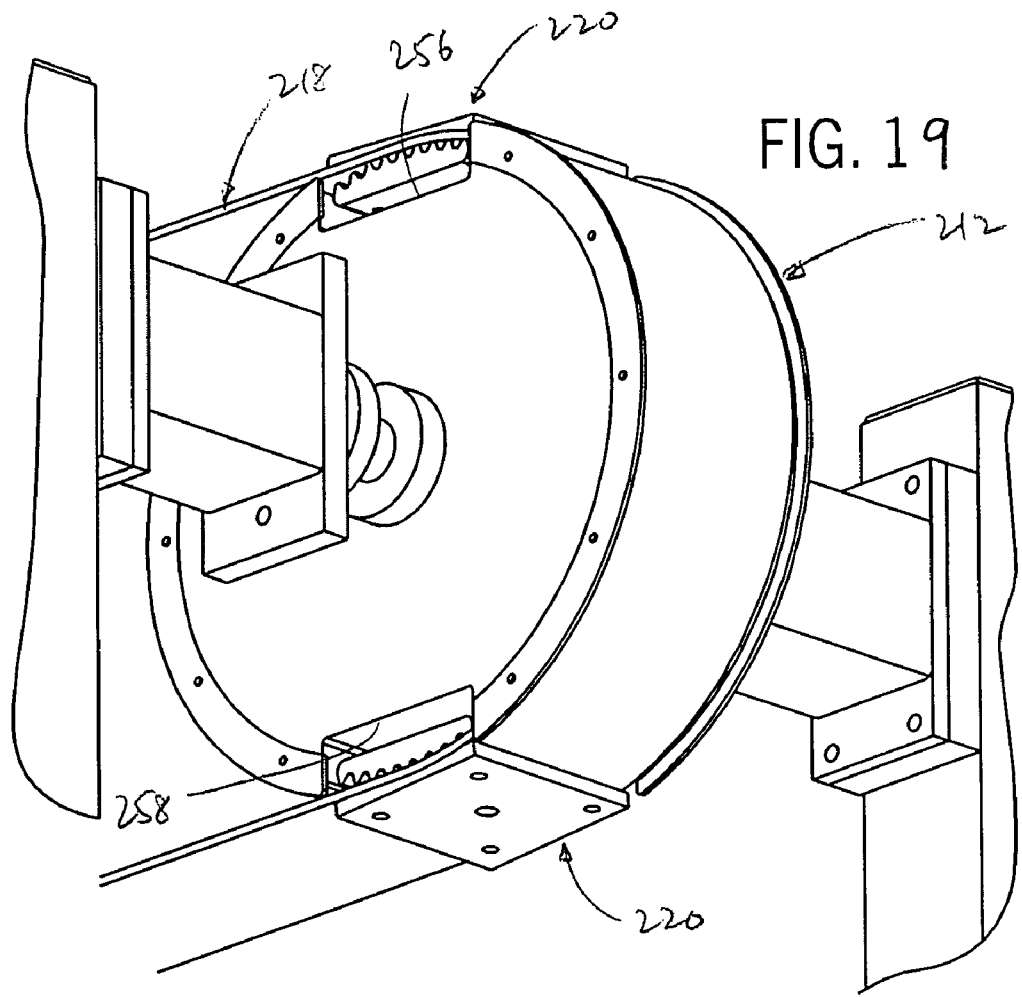
FIG. 19 is a partial isometric view showing one of a pair of pulleys incorporated into the article conveyor of FIG. 12.

As best illustrated in FIGS. 19-20, pulleys 212, 214 include recesses 256, 258, which are spaced and configured to receive the sequential clamp assemblies 220 as the clamp assemblies 220 move around the pulleys 212, 214 during movement of the belt 218. Recesses 256, 258 are spaced apart on the pulleys 212, 214 by a distance that corresponds to the space between adjacent clamp assemblies 220 on belt 218. In this manner, recesses 256, 258 receive each clamp assembly 220 and provide a smooth transition of the clamp assemblies 220 between the upper and lower runs of the conveyor belt 218. The outer surface of each pulley 212, 214 between recesses 256, 258, shown at 260 is provided with transverse teeth 260, which are configured to engage the ridges 226 and grooves 228 on the outer surface of belt 218, to drive belt 218 in response to rotation of pulleys 212, 214.

Each platen 108 is attached to the outer surface 254 of one of the outer clamp members 234. Representatively, platens 108 may be attached to the outer clamp members 234 by fasteners 236, which extend through aligned openings formed in the platen 108. Alternatively, the fasteners 236 may be studs that are mounted to the underside of each platen 108 in a pattern corresponding to that of the belt holes 230 and the clamp member holes 238, 250, such that nuts 254 engage the studs to secure the clamp members 232, 234 together onto belt 218. Each platen 108 may also be connected to the outer surface of its associated outer clamp member 234 in any other satisfactory manner, such as by welding.

Figure 13:
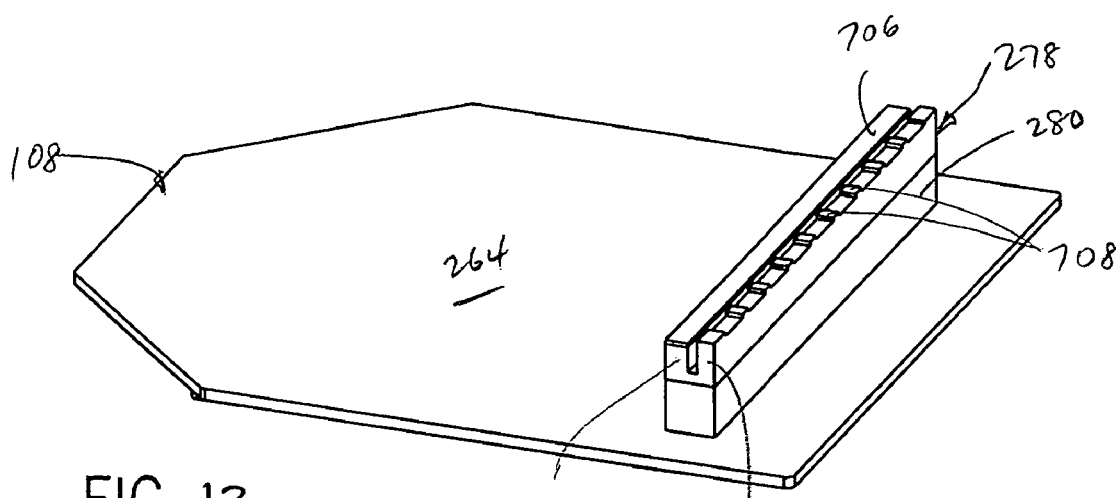
FIG. 13 is an isometric view of a platen incorporated in the article conveyor of FIG. 12.
Figure 14:
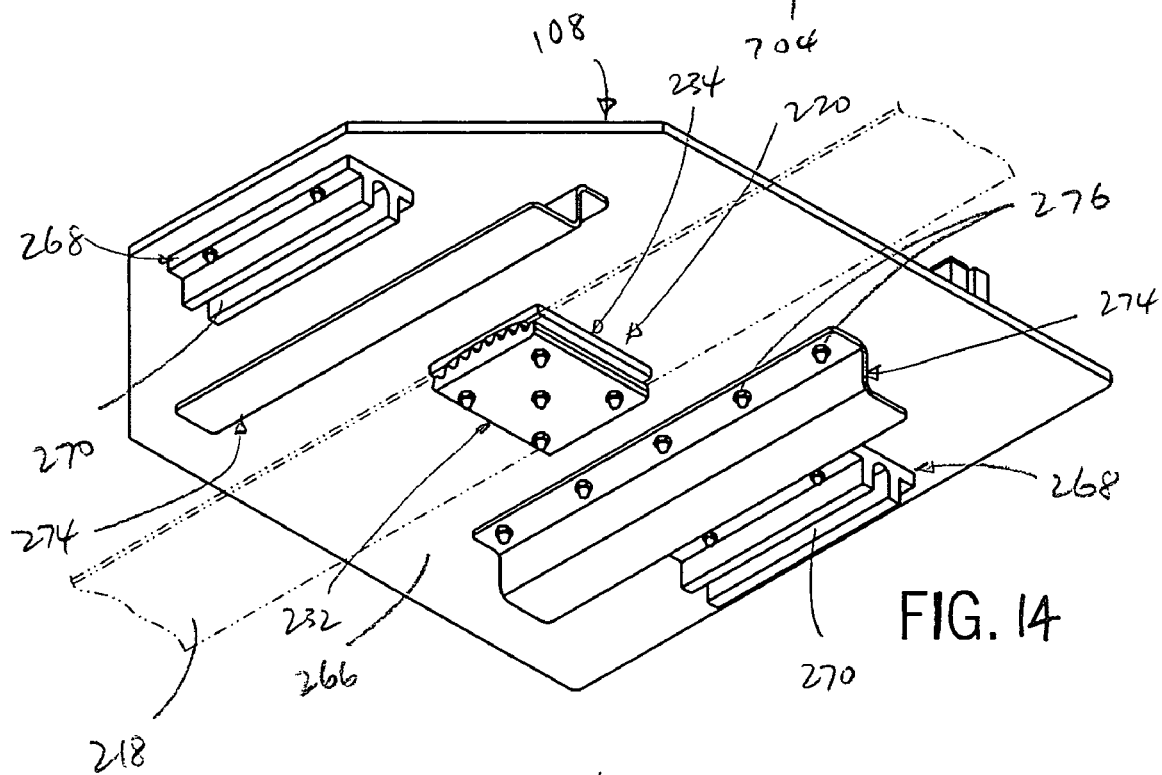
FIG. 14 is an isometric view showing the underside of the platen of FIG. 13.
Figure 15:
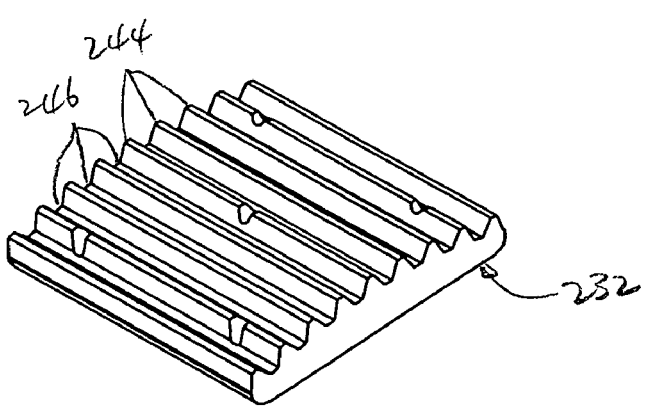
FIG. 15 is an isometric view of a clamp member that is utilized to secure the platens of FIGS. 13 and 14 to a belt incorporated in the article conveyor of FIG. 12.
Figure 16:
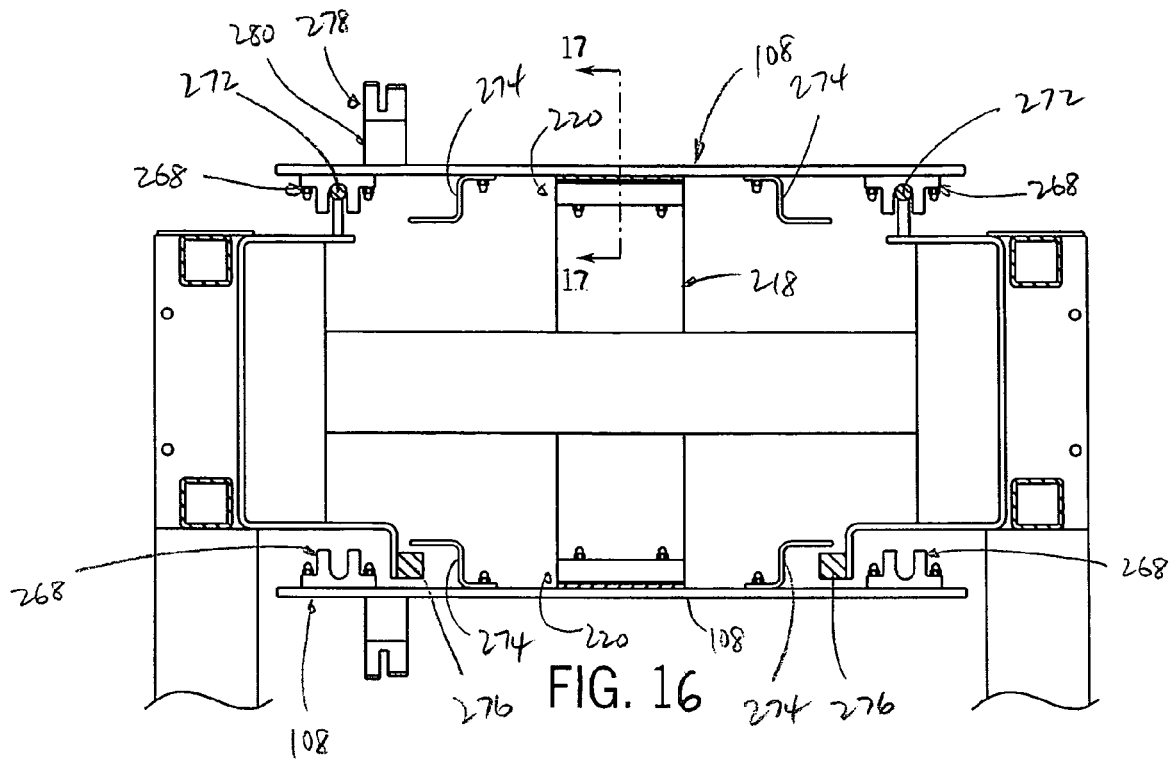
FIG. 16 is a transverse section view through the article conveyor of FIG. 12.
Figure 17:
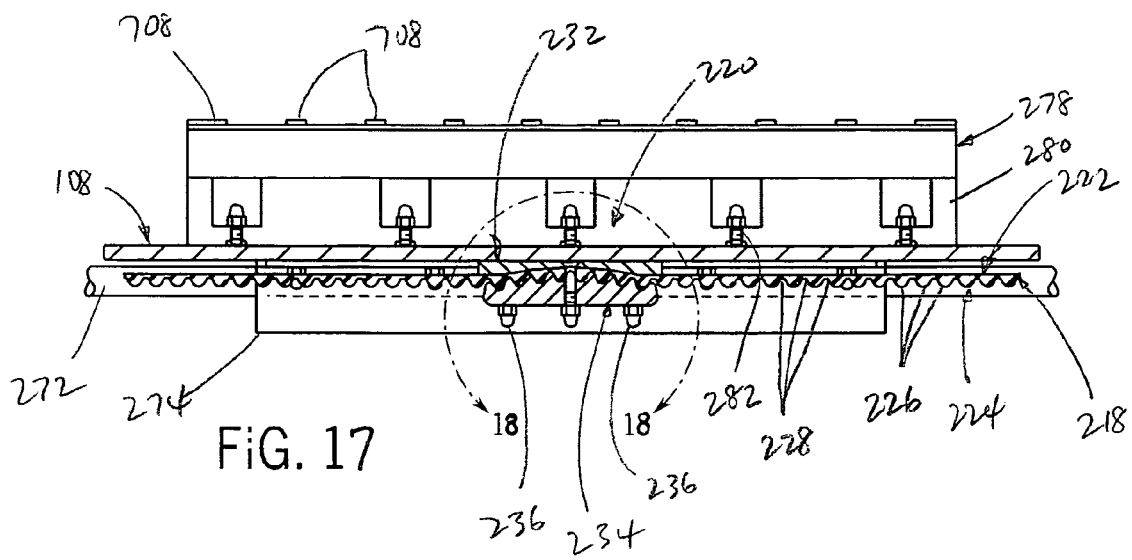
FIG. 17 is a partial section view taken along line 17-17 of FIG. 16.

As shown in FIGS. 13 and 14, each platen 108 is generally hexagonal member defining an outer article receiving surface 264 and an inner clamp assembly attachment surface 266. A pair of platen guide blocks 268 are attached to the front and back of the inner surface 266 of the platen 108. Each guide block 268 defines a slot or recess 270 configured to receive one or a pair of guide rails 272, which extend along opposed sides of the upper run of conveyor 102. The engagement of the guide blocks 268 and guide rails 272 maintains the attached platens 108 in a straight line during the vacuum packaging operation, which occurs during advancement of the platens 108 along the upper run of conveyor belt 218. This guided movement of platens 108 ensures proper positioning of the platens 108 during the cutting and sealing functions, discussed below.

A platen support 274 is mounted to the underside of each platen 108 inwardly of each guide block 268. Platen supports 274 are attached to platen 108 by a series of fasteners 276. Each platen support 274 is a bracket-like member that is configured to engage one of a pair of lower guide rails 276 (FIG. 16) along the lower run of the belt 218. The engagement of the platen supports 274 on the lower guide rails 276 keeps the weight of the platens 108 off the belt 218, to guide movement of platens 108 along the lower run of the belt 218.

As shown in FIG. 13, a clamp and seal member 278 is mounted to the outer surface 264 of each platen 108. In a manner to be explained, clamp and seal member 278 is adapted for use in clamping and sealing receptacle R before and after receptacle R is evacuated within one of vacuum chambers 116a-c. Clamp and seal member 278 is secured to platen 108 via a base member 280 and fasteners 282.

It can thus be appreciated that conveyor 102 with clamp assemblies provides a number of advantages over known conveying assemblies. Conveyor 226 replaces the conveyors of the prior art that required the use of tensioners and other complex mechanisms to tighten the belt to the pulleys of the conveyor. Clamp assemblies 220 also provide for a secure attachment of the platens 108 used in the vacuum packaging system 100. Conveyor 102 allows for continuous, indexing or intermittent movement of the system, as desired according to user requirements.

A clamp assembly 220 is located at the adjacent ends of adjacent sections of belt 218, to splice the belt sections together. To provide a splice function, the ends of adjacent belt sections are placed adjacent to and facing each other at the center of the clamp assembly 220. When the clamp members 232 and 234 are connected together with the end area of each belt section therebetween, the clamp assembly 220 formed by the clamp members 232 and 234 functions to engage the belt sections together in a manner that prevents axial movement of the belt sections and therefore ensures that belt 218 maintains the desired length.

While conveyor 102 has been shown in combination with a vacuum packaging system, it should be understood that conveyor 102 may be used in any environment in which individual conveying members can be utilized. In addition, while conveyor 102 has been shown and described as a platen-type conveyor, it is also understood that conveyor 102 may include other types of individual conveying members, such as buckets, trays, etc. Furthermore, while conveyor 102 has been shown and described as having a single belt, it is also understood that conveyor 102 may have two or more side-by-side belts in order to accommodate heavier use requirements. In the vacuum packaging system as shown and described, the vacuum heads lift the platens slightly when vacuum is applied to evacuate the packages, as will later be explained. In other applications, the load on the individual conveying members may be greater, thus requiring the use of multiple belts.

Combination Vacuum Manifold and Support Beam

FIGS. 21-26 illustrate vacuum chamber support beam 114, which is secured to vertical support plate 118 and supports vacuum chambers 116a-c on carriage assembly 112. Support beam 114 defines an interior that is sealed from the atmosphere and connected to an outside vacuum source (not shown), thereby additionally serving as a vacuum manifold for supplying vacuum to the individual vacuum chambers 116a-c. As will be described in greater detail below, vacuum chamber support beam 80 eliminates the need for multiple connections between the vacuum chambers 116a-c and the vacuum source (not shown).

Support beam 114 may be in the form of a closed tubular member having a generally rectangular cross section. Support beam 114 defines a first closed end 300 and a second vacuum connection end 302, and defines an interior or internal passage 304 extending therebetween, which forms an airway or vacuum chamber. An end plate 306 is mounted to the closed end 300 of support beam 114, to seal internal passage 304. End plate 306 may be mounted to support beam 114 via a series of bolts, screws, or other fasteners, in combination with a suitable gasket arrangement, to form an air tight seal to the interior of the support beam 114. Alternatively, end plate 306 may be welded or preformed as part of the support beam 114. Centrally located on the support beam 114 is a carriage attachment plate 308 for connecting support beam 114 to the carriage assembly 112.

A vacuum connection plate is located at the second end 302 of the support beam 114. Vacuum connection plate 310 maintains an airtight seal within the interior of support beam 114 and is connected to support beam 114 via a series of bolts, screws or other fasteners 86. Alternatively, vacuum connection plate 310 may be welded or preformed as part of the support beam 114. In the illustrated embodiment, vacuum connection plate 310 is mounted via fasteners to a flange 312 that is secured to the end of support beam 114. A rigid vacuum supply member, in the form of an elbow 314, is connected to and extends from the vacuum connection plate 310.

Vacuum supply member 314 defines a sealed internal airway that extends between support beam 114 and one end of a flexible vacuum supply tube, the opposite end of which is connected to the vacuum source. Vacuum supply member 314 includes a support beam connection end 316, and a vacuum tube connection end 318. In the illustrated embodiment, support beam connection end 316 is welded to the vacuum connection plate 310. It is understood, however, that the beam connection end 316 may alternatively be integrally formed with vacuum connection plate 310, or attached to vacuum connection plate 310 via any alternative means such as a threaded or clamp-type connection or other known means of attachment. At the opposite end, vacuum supply member 314 defines an open vacuum tube connection end 318. In the illustrated embodiment, vacuum tube connection end 318 is adapted for connection to a vacuum hose or tube 320 (FIGS. 25, 26) via a hose coupling 322. In a manner as is known, hose coupling 322 includes a pair of clamp halves pivotally connected via a pivot member. At the ends of the clamp halves opposite the pivot member are a pair of mating attachment ends. A threaded tightening screw 324 is inserted through attachment ends to tighten coupling 322 around the vacuum hose 320. It should be understood that although vacuum supply member 314 is illustrated as an elbow, a wide variety of other shapes and configurations could be employed depending on the position of the vacuum source and the other components of the system 100.

As noted above, the vacuum hose 320 extends between vacuum supply member 314 and a separately located conventional vacuum source (not shown). Vacuum hose 320 is of conventional construction, and provides an airtight passageway between the vacuum source and the vacuum supply member 314 to supply vacuum to the interior of support beam 114. Vacuum hose 96 is flexible and stretchable, to accommodate movement of support beam 114 during movement of vacuum chambers 116a-42c as described above.

Several components of the system 100 are supported on the support beam 114. Three vacuum chambers 116a-c having dual action air cylinders 500, which will later be described in detail, are mounted to and supported by the support beam 114. Vacuum chambers 116a-c are connected to support beam 114 via mating chamber attachment plates 330 and beam attachment plates 332. A pair of mounting bars 330 extend from each beam attachment plate 332, and are pivotably connected to upstanding mounting ears 332 carried by a vacuum head mounting plate 334 mounted to the upper wall of support beam 114. The pivotable mounting of each vacuum chamber 1116a-c to support beam 114 in this manner enables the vacuum chambers 116a-c to be raised for access to its internal components, which facilitates service and cleaning.

Support beam 114 also mounts a series of vacuum valves 400, the details of which will later be explained, which form a sealed connection into the internal passageway defined by the support beam 114. Each vacuum valve 400 controls the supply of vacuum from the interior of support beam 114 to the interior of one of vacuum chambers 116a-c.

Extending from the vacuum valves 400 are a series of inverted U-shaped vacuum chamber connection tubes 336. Each vacuum chamber connection tube 336 is connected to the upper end of a vacuum tube 338, the lower end of which is connected to the vacuum valve 400. Each vacuum chamber connection tube 336 is mounted at its opposite end to a vacuum connector hose or tube 340, which is in turn connected to the upper end of a vacuum supply head 342 of one of the vacuum chambers 116a-c. Each vacuum valve 400, vacuum tube 338, vacuum chamber connection tube 336 and vacuum tube 340 maintains an airtight passageway between the support beam 114 and the vacuum chambers 116a-c.

It can thus be appreciated that the support beam 114 provides a dual function, serving as both a physical support for the vacuum chambers and associated tubes and valves, and as a vacuum manifold for supplying vacuum from a vacuum source to the interiors of the vacuum chambers in the vacuum packaging system. This replaces the known rotary system of the prior art, which required a plurality of individual and cumbersome hoses connected between the vacuum source and each vacuum chamber. Such prior art rotary systems, which involve a number of long hose connections, involved movement of a great amount of dead air in order to communicate vacuum to the vacuum chambers, thereby greatly decreasing the efficiency of the overall system. Accordingly, the use of the dual function support beam 114 both reduces the number of parts in the system and increases overall system efficiency by placing the vacuum manifold close to the vacuum chambers.

Two-Stage Vacuum Valve

FIGS. 27-32 illustrate the construction of each vacuum valve 400. Vacuum valve 400 includes a valve body assembly, shown generally at 402, having a vacuum housing 404 that defines an internal cavity 406, in combination with an upstanding vacuum chamber connection tube 408 and a two-stage discrete function control valve assembly 410 which includes a cylinder block 412, an exhaust block 414 positioned between cylinder block 412 and vacuum housing 404, and a cylinder cap 416 mounted to the upper end of cylinder block 412.

Internal cavity 406 of vacuum housing 404 opens downwardly, and is surrounded by a peripheral rim 418 that is adapted to rest on the upper wall of the support beam 114 of vacuum packaging system 100. With this construction, the upper wall of the support beam 114 cooperates with the side walls and rim 418 to enclose internal cavity 406 of vacuum housing 404. The upper wall of vacuum housing 404, shown at 420, is formed with an opening 422 that establishes communication between vacuum housing internal cavity 406 and an internal passage 424 defined by connection tube 408. One of inverted U-shaped vacuum chamber connection tubes 336 is connected to the upper end of connection tube 408, for establishing a flow path between vacuum housing internal cavity 406 and the interior of the associated one of vacuum chambers 116a-c.

Control valve assembly 410 is mounted to vacuum housing 404 upper wall 420 in a location laterally spaced from opening 422 and connection tube 408. Generally, control valve assembly 410 functions to selectively control the supply of vacuum from the interior of support beam 114 to internal cavity 406, and thereby to the associated vacuum chamber through connection tube passage 424, and to open the vacuum chamber interior to ambient pressure, to thereby relieve vacuum pressure through connection tube passage 424 and vacuum housing internal cavity 406. Control valve assembly 410 includes a vacuum control member 424 and an exhaust control member 426, which are mounted within the interior of control valve assembly 410.

Figure 30:
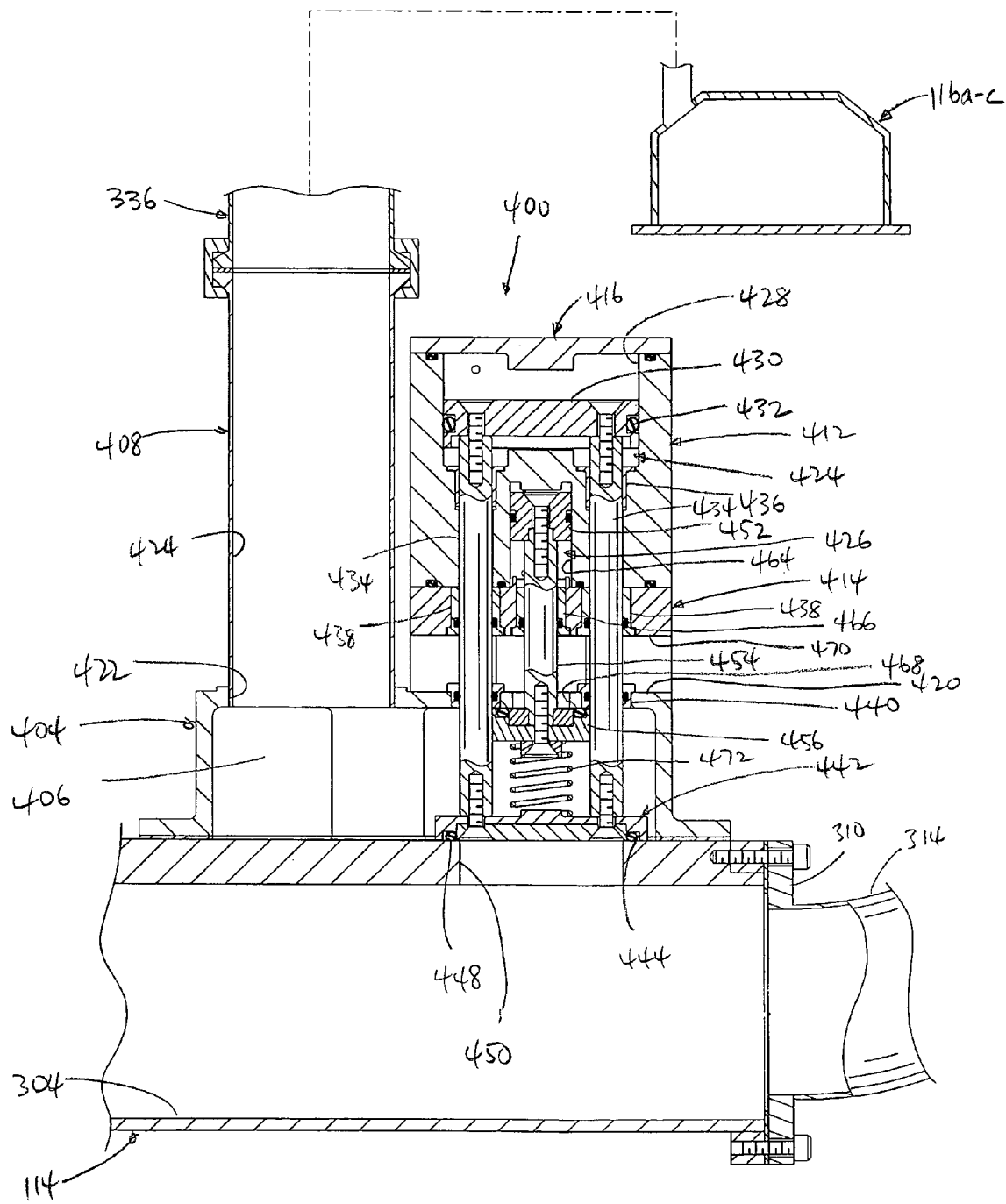
FIG. 30 is a cross sectional view of the vacuum valve of FIGS. 27 and 28, showing the valve in a neutral or off position.
Figure 31:
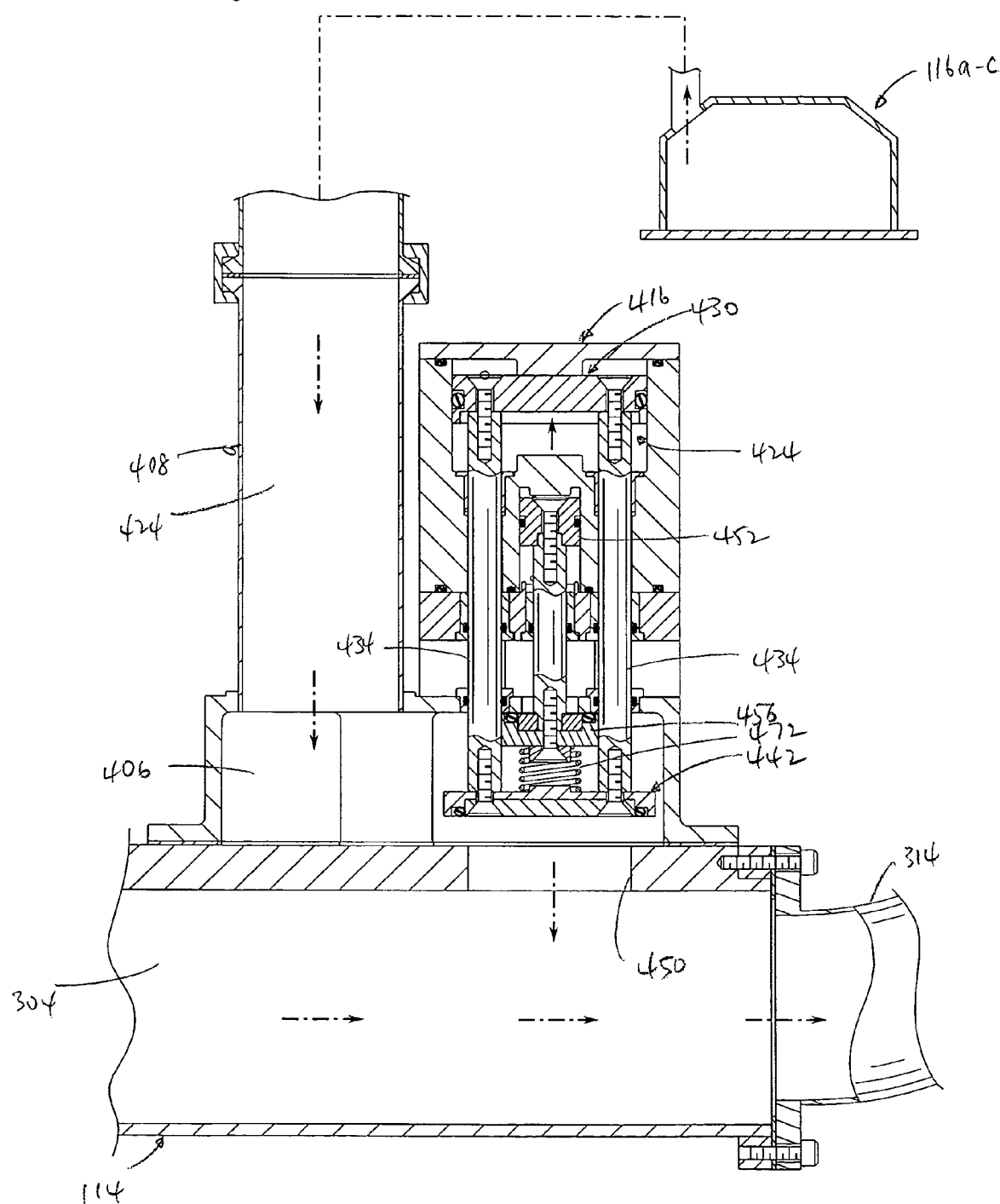
FIG. 31 is a view similar to FIG. 30, showing the vacuum valve in an evacuation position for supplying vacuum to the interior of a vacuum chamber.

Cylinder block 412 of control valve assembly 410 defines a cavity 428 that is enclosed by cylinder cap 416. Vacuum control member 424 includes a piston head 430 contained within cavity 428, which has a peripheral seal ring 432 that engages the internal walls of cylinder block 412 that define cavity 428, to isolate the area of cavity 428 above piston head 430 from the area of cavity 428 below piston head 430. Vacuum control member further includes a pair of piston rods 434 are connected to piston head 430 via suitable fasteners, and extend through passages in cylinder block 412 fitted with appropriate bushings 436 for guiding movement of vacuum control member 424. Piston rods 434 also extend through aligned passages in exhaust block 414 and through aligned openings in upper wall 420 of vacuum housing 404, which are fitted with appropriate bushings and seals 438, 440, respectively, to guide movement of piston rods 434 and to seal around piston rods 434. The lower ends of piston rods 434 are secured to a vacuum poppet member 442 that includes a seal seat 444, a seal retainer 446, and a seal ring 448. Vacuum poppet member 442 is configured to be placed over an opening 450 in the upper wall of the support beam 114, and is movable between a closed position as shown in FIG. 30, in which seal ring 448 of vacuum poppet member 442 seals the support beam opening 450, and an open position as shown in FIG. 31, in which vacuum control member 424 is moved upwardly so as to lift vacuum poppet member 442 and to establish communication between the support beam opening and internal cavity 406 of vacuum housing 404.

Exhaust control member 426 includes a piston head 452 connected via a suitable fastener to a piston rod 454. An exhaust poppet member 456 is mounted to the lower end of piston rod 454 via a suitable fastener, and includes a seal seat 458 and a seal retainer 460, which cooperate to mount a seal member 462. Exhaust piston head 452 is movably mounted within a downwardly facing cavity 464 defined by cylinder block 412, and includes an appropriate seal for isolating the areas above and below exhaust piston head 452. Piston rod 454 extends through a passage defined by exhaust block 414, which is fitted with an appropriate bushing and seal 466, for guiding movement of exhaust control member 426.

Figure 32:
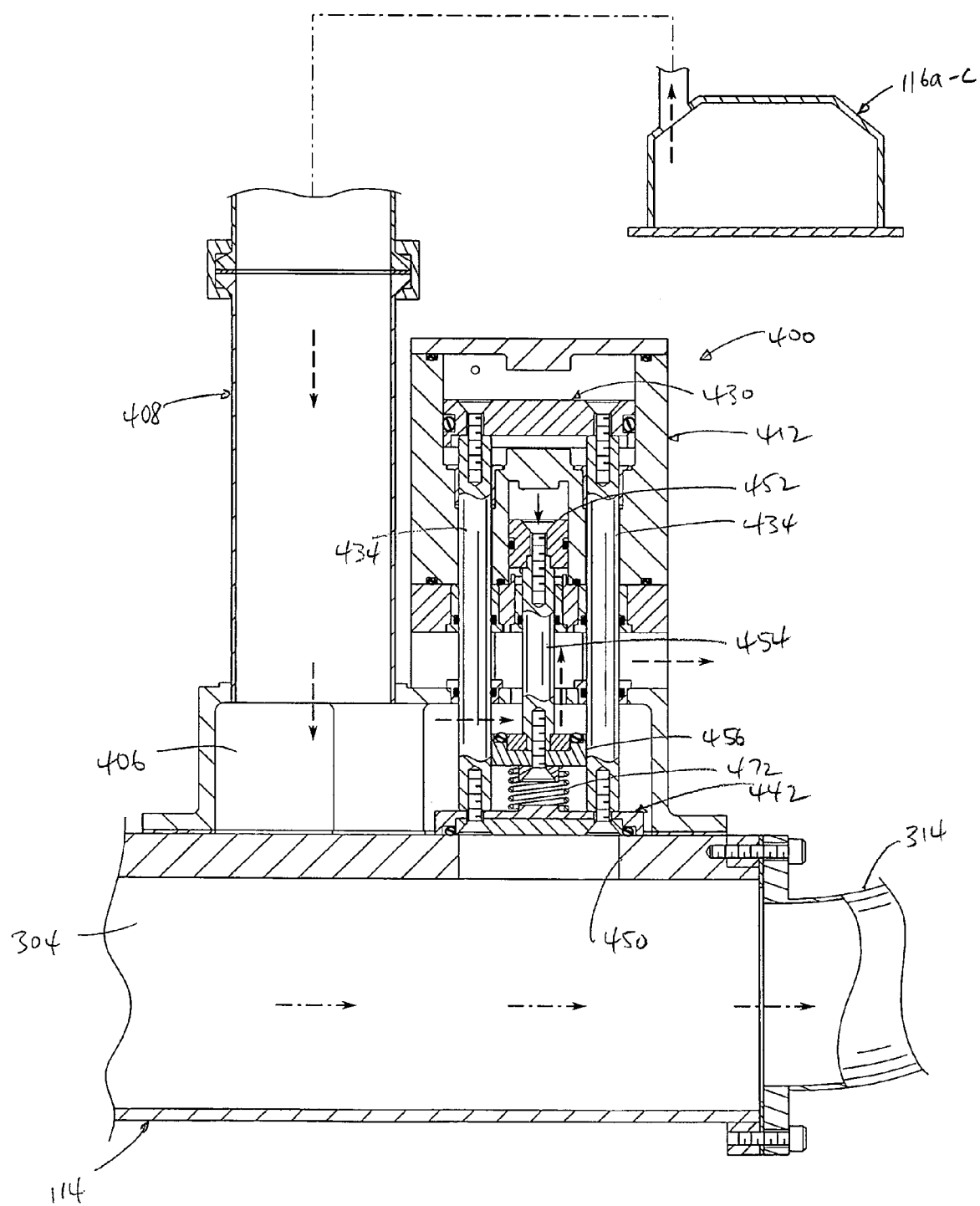
FIG. 32 is a view similar to FIGS. 30 and 31, showing the vacuum valve in an exhaust position for exposing the interior of the vacuum chamber to ambient air pressure.
Figure 33:
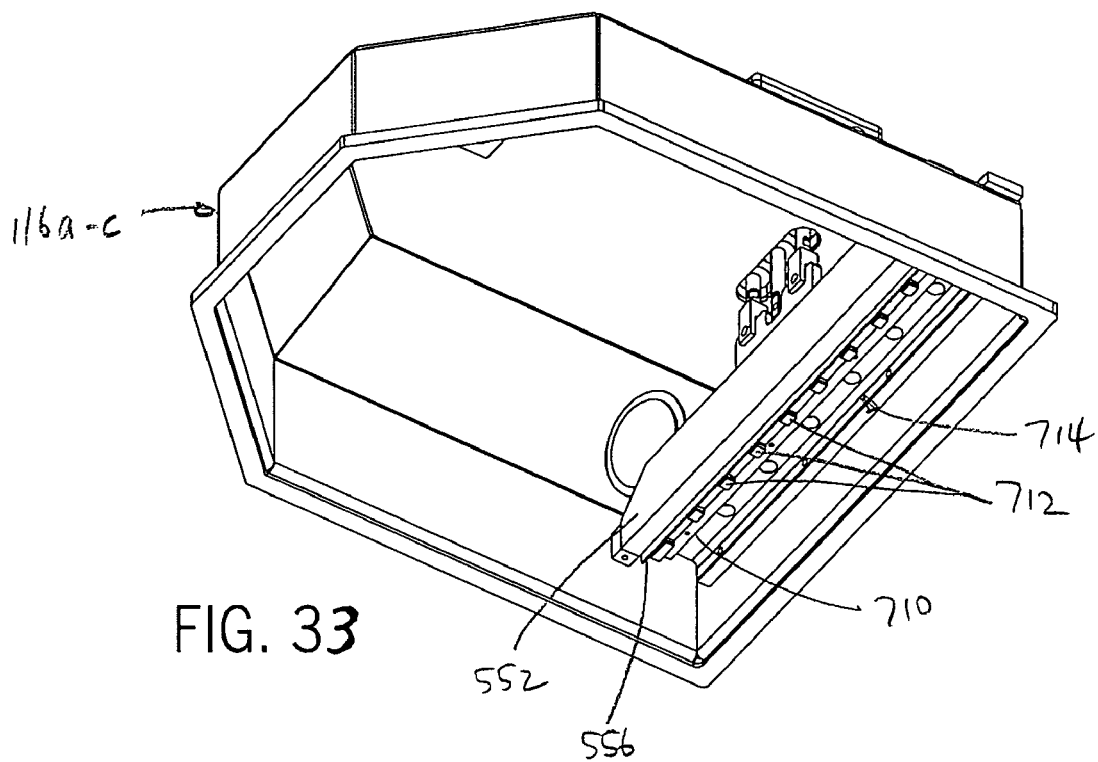
FIG. 33 is an underside isometric view of one of the vacuum chambers incorporated in the evacuation system of FIG. 2, illustrating a seal bar and knife contained within the interior of the vacuum chamber for sealing an evacuated receptacle and for severing an end area of the receptacle outwardly of the seal.
Figure 34:
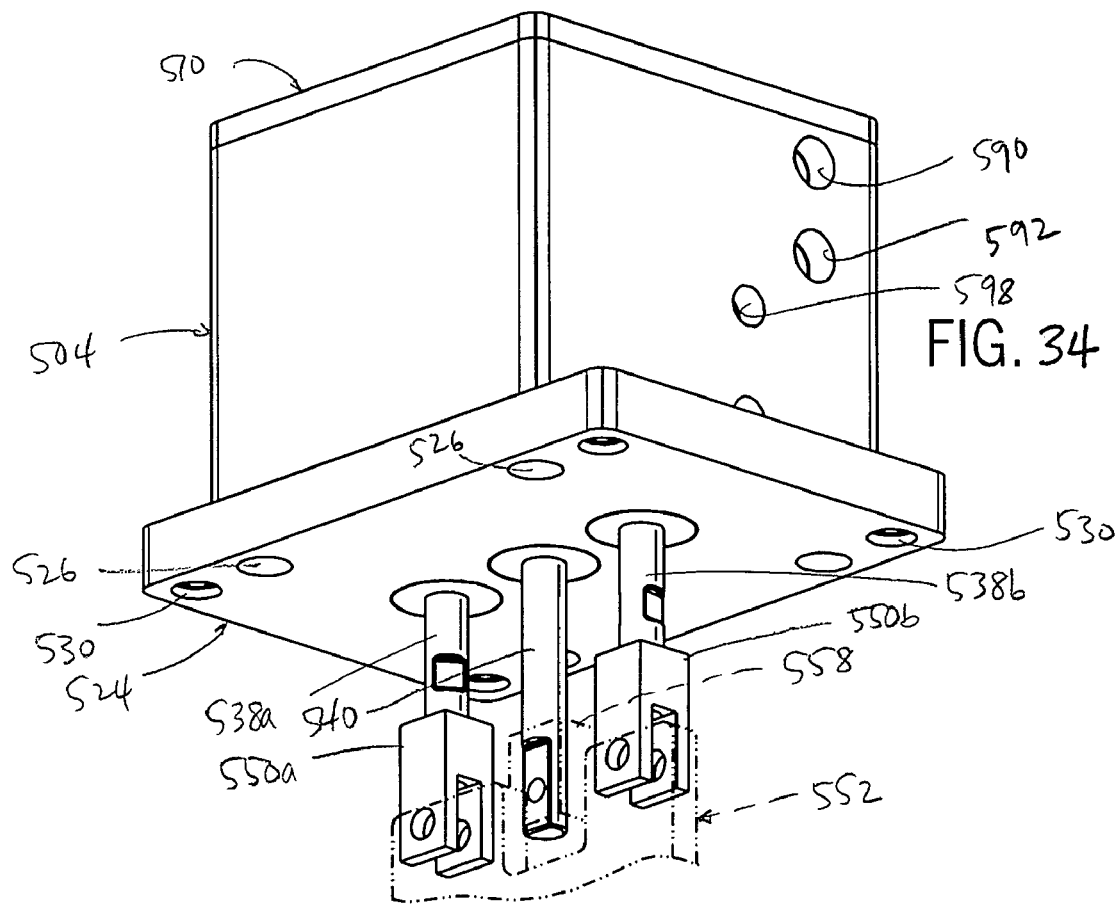
FIG. 34 is an isometric view of a dual action air cylinder secured to the vacuum chamber for operating the seal bar and the knife shown in FIG. 33.
Figure 35:
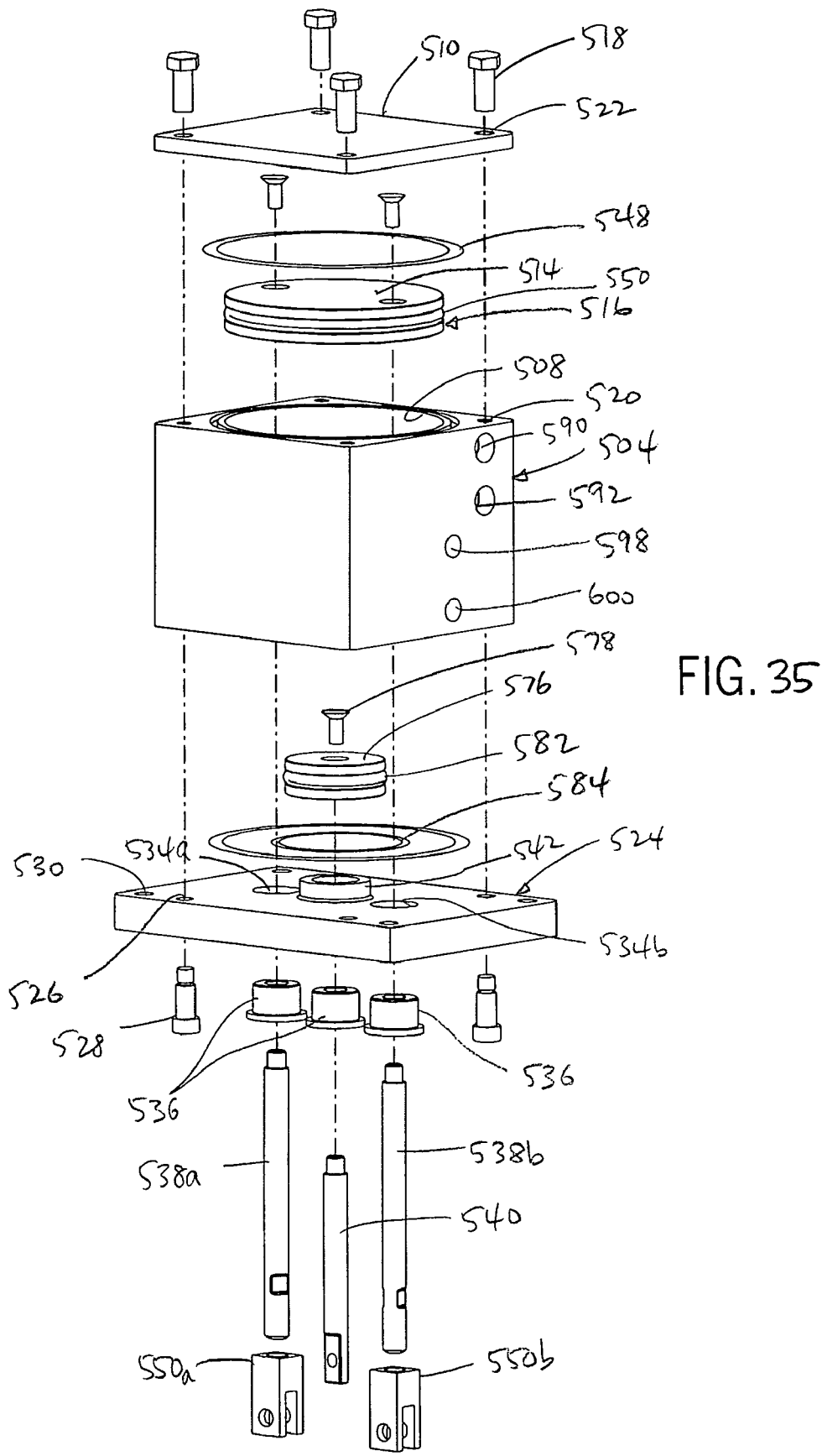
FIG. 35 is an exploded isometric view showing the components of the dual action air cylinder of FIG. 34.

An opening 458 is formed in upper wall 420 of vacuum housing 404, and establishes communication between vacuum housing internal cavity 406 and a series of exhaust passages 470 that open to the exterior of exhaust block 414. Exhaust control member 426 is movable between a closed position as shown in FIGS. 30 and 31, in which seal member 462 seals vacuum housing internal cavity 406 from exhaust passages 470, and an open position as shown in FIG. 32, in which exhaust poppet member 456 is moved downwardly away from the lower surface of vacuum housing upper wall 420, so as to establish communication between vacuum housing internal cavity 406 and exhaust passages 470. A biasing member, in the form of a spring 472, bears between vacuum poppet member 442 and exhaust poppet member 456, for biasing vacuum poppet member 442 and exhaust poppet member 456 toward their closed positions.

During operation, each vacuum valve 400 functions as follows to selectively communicate vacuum from the interior of vacuum manifold support beam 114 to its associated vacuum chamber 116a, 116b or 116c. To supply vacuum to each vacuum chamber, the vacuum valve 400 interconnected with the vacuum chamber is operated so as to move the vacuum control member 424 upwardly so as to unseat vacuum poppet member 442. To accomplish this, pressurized air is supplied to the area of cylinder block cavity 428 located below piston head 430 while exhausting air from the area above piston head 430. Vacuum control member 424 is thus moved upwardly, against the force of spring 472, to move vacuum poppet member 442 upwardly and to communicate vacuum from the interior of the support beam 114 through vacuum housing internal cavity 406 and connection tube internal passage 424 to the vacuum chamber interior. Such upward movement of vacuum control member 424 compresses spring 472, which applies a force to exhaust poppet member 456 that maintains exhaust poppet member 4567 in the closed position during evacuation. After vacuum has been supplied to the vacuum chamber for an appropriate time, the supply of pressurized air to the lower area of cavity 428 is cut off and vacuum control member 424 is returned to the closed position, under the influence of spring 472 as well as in response to the supply of pressurized air to the upper area of cavity 428 above piston head 430, if desired, while exhausting air from the area below piston head 430.

When it is desired to vent the evacuation chamber 116a-c so as to relieve the vacuum pressure therewithin, control valve assembly 410 is operated so as to move exhaust control member 426 from the closed position to the open position. To accomplish this, pressurized air is supplied to the area of cavity 464 above piston head 452, to move vacuum control member 424 downwardly so as to unseat exhaust poppet member 456, as shown in FIG. 32. Such downward movement of exhaust poppet member 456 opens vacuum housing internal cavity 406 to atmosphere through opening 468 and exhaust passages 470, to relieve vacuum pressure in the vacuum chamber. Such downward movement of exhaust control member 426 functions to compress spring 472, which urges vacuum poppet member 442 toward its closed position during venting. When the venting operation is complete, the supply of pressurized air to the area of cavity 464 above piston head 452 is cut off and vented. The force of spring 472 functions to return exhaust control member 426 to the closed position of FIGS. 30 and 31, which can be accomplished in combination with the supply of pressurized air to the area of cavity 464 below piston head 452, if desired.

It can thus be appreciated that, with the construction of vacuum valve 400 as shown and described, the evacuation and venting of the vacuum chambers can be controlled separately from each other. This is in contrast to prior art vacuum valves, which typically are either in an evacuation mode or a venting mode and cannot be controlled separately from each other.

Dual Action Cylinder

As noted previously, and as shown in FIG. 510, a dual action air cylinder 500 is adapted for placement on the top wall 502 of each vacuum chamber 116a-c.

FIGS. 33-43 illustrate the construction and operation of each dual action air cylinder 500, which is generally housed within a rectangular cylinder block 504 preferably made from stainless steel. The cylinder block 504 is comprised of four similar rectangular side walls 506a-d defining a cylinder bore 508 within. At the top of the cylinder block 504 is a rectangular cap 510 configured to enclose the upper opening of the cylinder bore 508. The rectangular cap 510 includes a thicker midsection 512 (FIG. 37) configured to abut the rear face 514 of a sealing bar piston 516 as described below. The cap 510 is secured to the cylinder block 504 by a series of bolts 518 or other known securing means inserted through apertures 520 located on the top of the side walls 5406a-d and apertures 522 located in the corners of the rectangular cap 510.

Attached to the bottom of the cylinder block 504 is a cylinder base 524 configured to enclose the lower opening of the cylinder bore 508. The cylinder base 524 includes a first set of spaced cylinder attachment apertures 526 configured to receive a securing means such as screws 528 to secure the cylinder base 524 to the cylinder block 504. The cylinder base 524 also includes a second set of spaced vacuum chamber attachment apertures 530 configured to receive a securing means such as bolts or screws 532 (FIG. 36) to secure the cylinder base 524 to the top wall 502 of a vacuum chamber 116a-c.

The cylinder base 524 includes three separately formed bores 534 with bushings 536 and sealing elements disposed therein. Two sealing bar piston rod receiving bores 534a and 534b are spaced on opposite sides of a centrally located knife piston rod receiving bore 534c. The sealing bar piston rod receiving bores 534a, 534b, are configured to receive and permit vertical movement of slidable sealing bar piston rods 538a and 538b. Bushings 536 and sealing rings are located within the sealing bar piston rod receiving bores 534a, 534b to seal the bores around the sealing bar piston rods 538a and 538b and allow for smooth movement of the rods 538a, 538b through the bores 534a, 534b.

The knife piston rod receiving bore 534c is configured to receive and permit vertical movement of a slidable knife piston rod 540. The knife piston receiving bore 534c includes a raised annular wall 542. Bushing 536 and a sealing ring are located within the knife piston rod receiving bore 534c to seal the bore around the knife piston rod 540 and allow for smooth movement of the rod 540 through the bore 534c.

Figure 36:
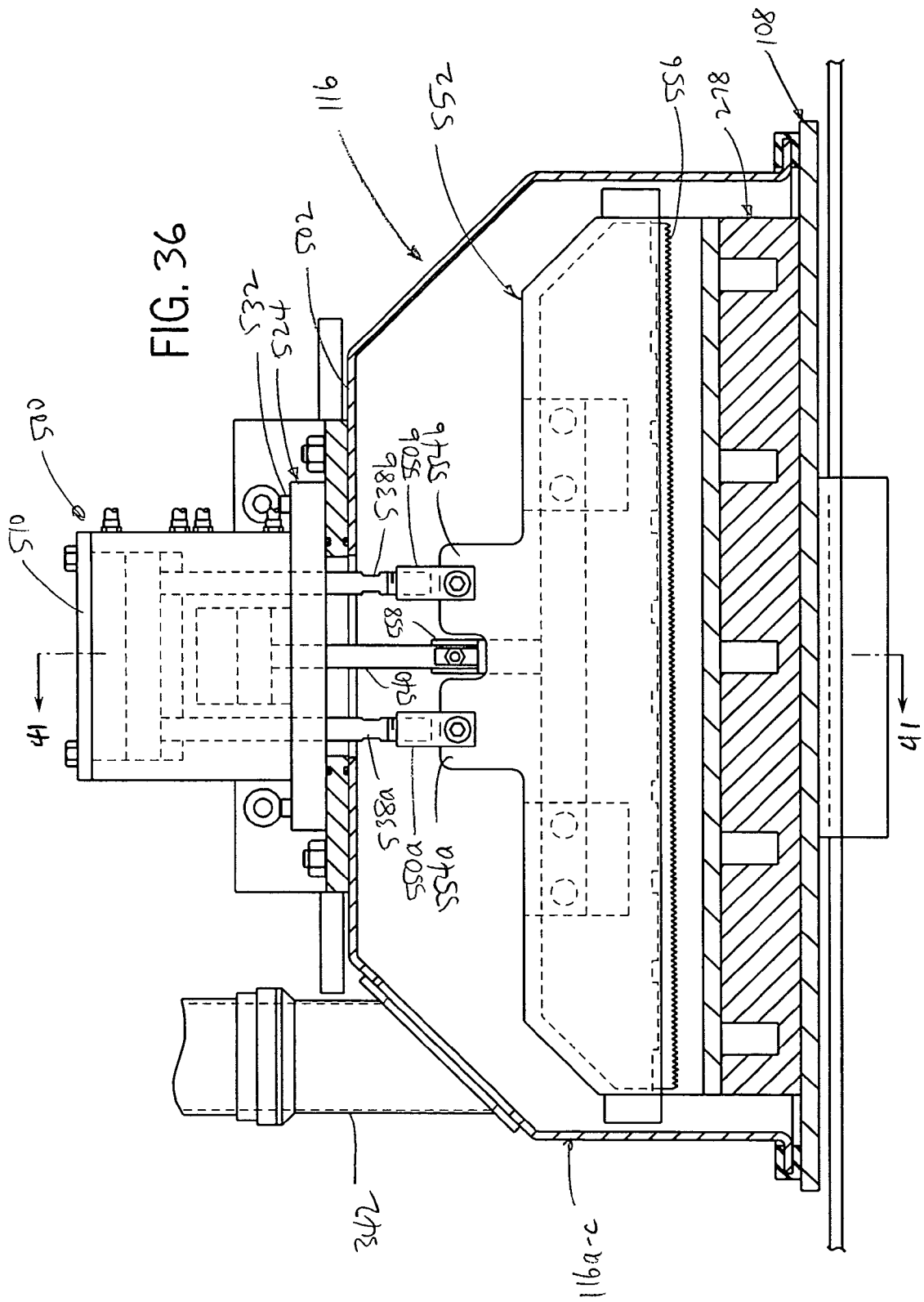
FIG. 36 is a section view through the vacuum chamber of FIG. 33, showing the vacuum chamber in engagement with one of the conveyor platens on which an article to be packaged is supported.

Located within the cylinder bore 508 are two separately operable pistons. Sealing bar piston 516 is connected to the inner or upper end of each slidable sealing bar piston rod 538a and 538b. The inner ends of the sealing bar piston rods 538a, 538b extend through the sealing bar piston rod receiving bores 534a, 534b and are connected to the sealing bar piston 516 by a common attachment means, such as a screw 544. The distal end of each sealing bar piston rods 538a, 538b is of a smaller diameter than the rest of the piston rod, and extends into a recess 546 formed in the sealing bar piston 516. The distal end of each sealing bar piston rod 538a, 538b includes a threaded passage, which receives the threads of screw 544 or other attachment means. An O-ring 548 fits within a groove 550 on the side wall of the sealing bar piston 516 to seal against the inner surface of bore 508. At the inner end of the sealing bar piston rods 538a, 538b are couplings 550a, 550b for coupling a sealing bar to the sealing bar piston rods 538a, 538b. As shown in FIG. 36, sealing bar 552 includes a pair of upstanding ears 554a, 554b, to which couplings 550a, 550b, respectively, are secured. Referring to FIG. 41, the outer end of knife piston rod 540 is connected to a knife 556 through a knife coupling 558. Knife coupling 558 has an offset configuration, which enables knife coupling 558 to be secured to the lower end of knife piston rod 540 while positioning knife 556 adjacent the surface of seal bar 552.

Cylinder block 504 is formed so as to include a knife piston housing 560 in which a knife piston 562 is located. The knife piston housing 560 consists of an annular vertically extending side wall 564 having a lower end that seals against the cylinder base 524. A transverse upper wall 566 extends across and seals side wall 564, to define a piston-receiving cavity 5572 within which knife piston 562 is received. The transverse wall 566 includes an upwardly extending central protrusion 570, which is adapted to engage the lower face 572 of the sealing bar piston 516 when the sealing bar piston 516 is in its fully extended position. Transverse upper wall 566 further includes a downwardly extending protrusion 574 that is configured to abut the upper face 576 of the knife piston 562 when the knife piston 562 is in its fully retracted position. In an illustrative construction, cylinder block 504 is machined with a large bore extending downwardly from the top and a small bore extending upwardly from the bottom, to form side wall 564 and ceiling transverse upper wall 566.

Knife piston 562 is connected to the upper end of the slidable knife piston rod 540. The upper end of the knife piston rod 540 extends through the knife piston rod receiving bore 534c and is connected to the knife piston 562 by a common attachment means, such as a screw 578. The distal end of the knife piston rod 540 has a reduced diameter, and extends into a recess 580 formed in the knife piston 562. A threaded passage is formed in the distal end of knife piston rod 540, which receives the treads of screw 578 or other attachment means. Knife piston 562 includes a groove 582 within which an O-ring 5594 is received, for sealing knife piston 562 against the surface of cavity 5572.

Figure 37:
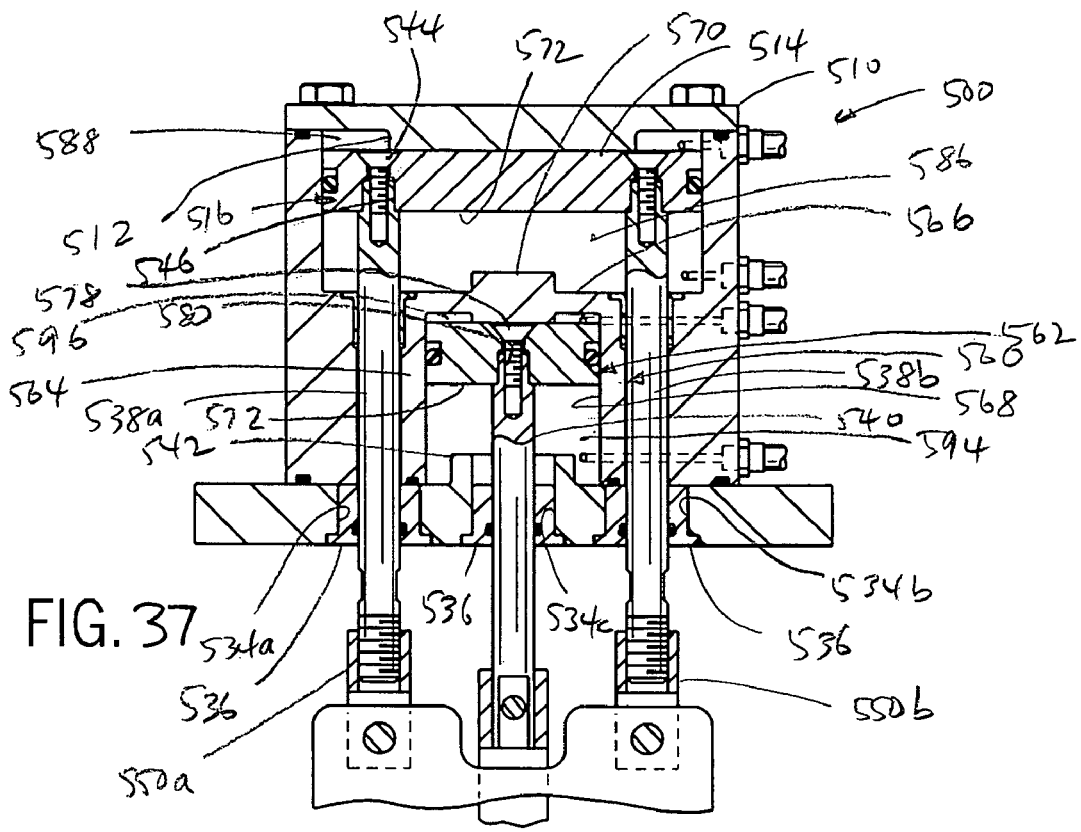
FIG. 37 is a section view through the actuating cylinder of FIG. 34, showing the cylinder in an inoperative position.

The cross sectional views of the dual action air cylinder 500 shown in FIGS. 37-40 illustrate the various positions of the sealing bar piston 516 and knife piston 562 at different stroke points in operation of air cylinder 500, to provide sequential operation of seal bar 552 and knife 556. As illustrated in FIG. 37, both the sealing bar piston 516 and the knife piston 562 are in their fully retracted positions, so that both sealing bar 516 and knife 556 are raised. As illustrated in FIG. 37, a sealing bar piston lower chamber or volume 586 is defined by the cylinder block 504, the transverse wall 566 of the knife piston housing 560, and the lower face 572 of the sealing bar piston 516.

As shown in FIG. 37, a sealing bar piston upper chamber or volume 588 is defined by the side walls 506*a-d* of the cylinder block 504, the rear face 514 of the sealing bar piston 516, and the cylinder cap 510, and may be formed by an annular groove in the inner surface of cap 510 outwardly of the thicker midsection 512 of the rectangular cap 510. The upper volume 588 communicates through a channel, which extends through the cylinder block 504, with a primary inlet/exhaust port 596 providing communication between the upper volume 588 and the cylinder's exterior environment. A compressed fluid source (not shown) is connected to the upper primary inlet/exhaust port 596 (FIG. 34) to selectively supply a fluid to the rear face 514 of the sealing bar piston 516. The fluid provided by the compressed fluid source may be a gas or a liquid. Most preferably, a gas such as air is used. Thus, by rapidly providing air through the fluid channel into the upper volume 588, the upper volume 588 expands, thereby moving the sealing bar piston 516 forward and reducing the sealing bar piston lower volume 586.

As noted above, the sealing bar piston lower volume 586 is defined by the side walls 5406*a-d* of the cylinder block 504, the lower face 572 of the sealing bar piston 516, and the transverse wall 566 of the knife piston housing 560. When the sealing bar piston 516 is in its fully extended position (FIGS. 38 and 39), the sealing bar piston lower volume 586 is defined by the protrusion 570 that extends from the transverse wall 566 of the knife piston housing 560, the lower face 572 of the sealing bar piston 516, and the annular surfaces defined by transverse wall 566 outwardly of protrusions 570 of the knife piston housing 560. The sealing bar piston lower volume 588 is in fluid communication with a primary lower fluid channel, which extends radially outward through the cylinder body 504 and is in fluid communication with a sealing bar piston lower primary inlet/exhaust port 592 providing communication between the lower volume 588 and exterior environment. The compressed fluid source is connected to the lower primary inlet/exhaust port 96 to selectively supply a fluid, preferably air, to the lower face 572 of the sealing bar piston 516. By rapidly providing air to the lower face 572 of the sealing bar piston 516, the sealing bar piston 516 is raised towards its retracted position (FIGS. 37 and 40).

Figure 39:
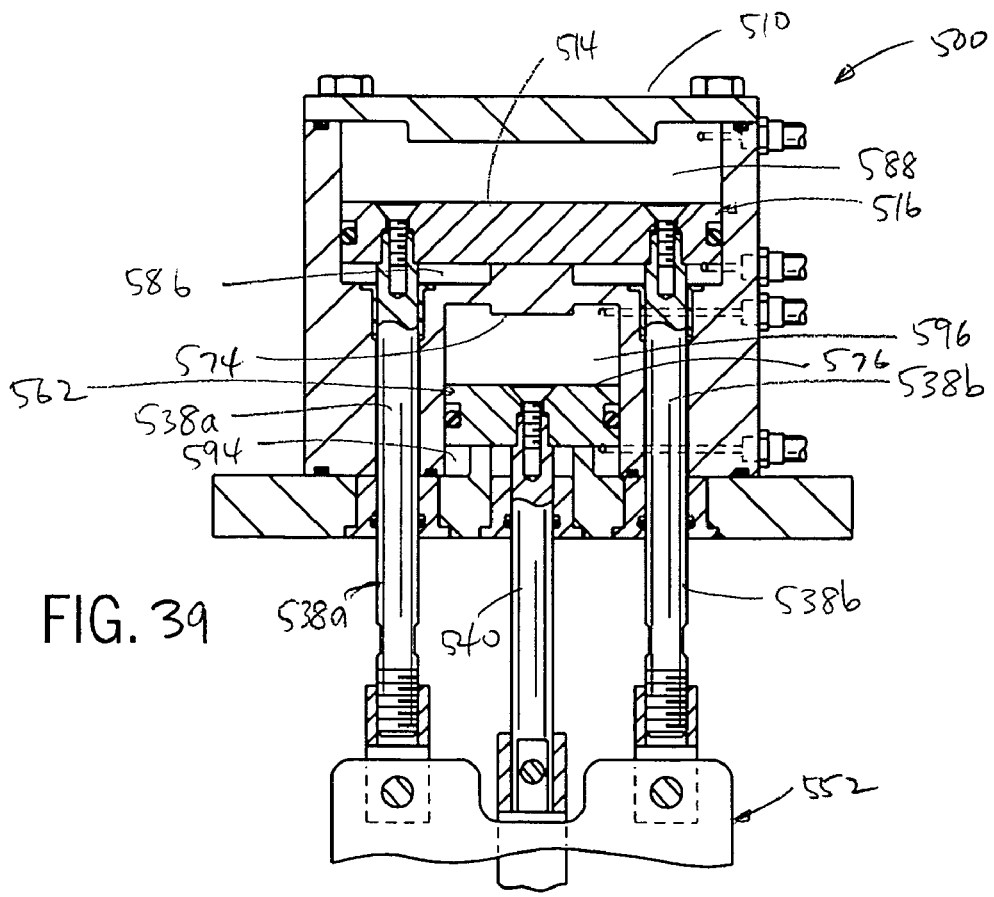
FIG. 39 is a view similar to FIGS. 37 and 38, showing the cylinder in a cutting position for severing the end area of the receptacle.
Figure 38:
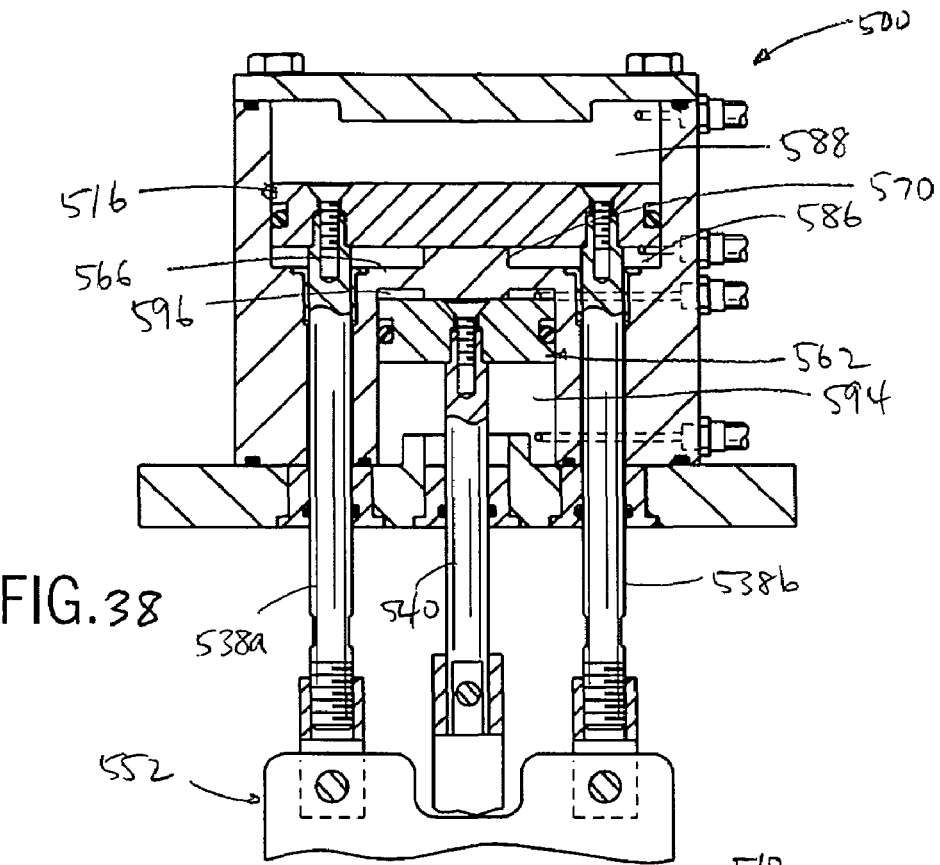
FIG. 38 is a view similar to FIG. 37, showing the cylinder in a sealing position in which the seal bar is moved downwardly to seal the receptacle.
Figure 40:
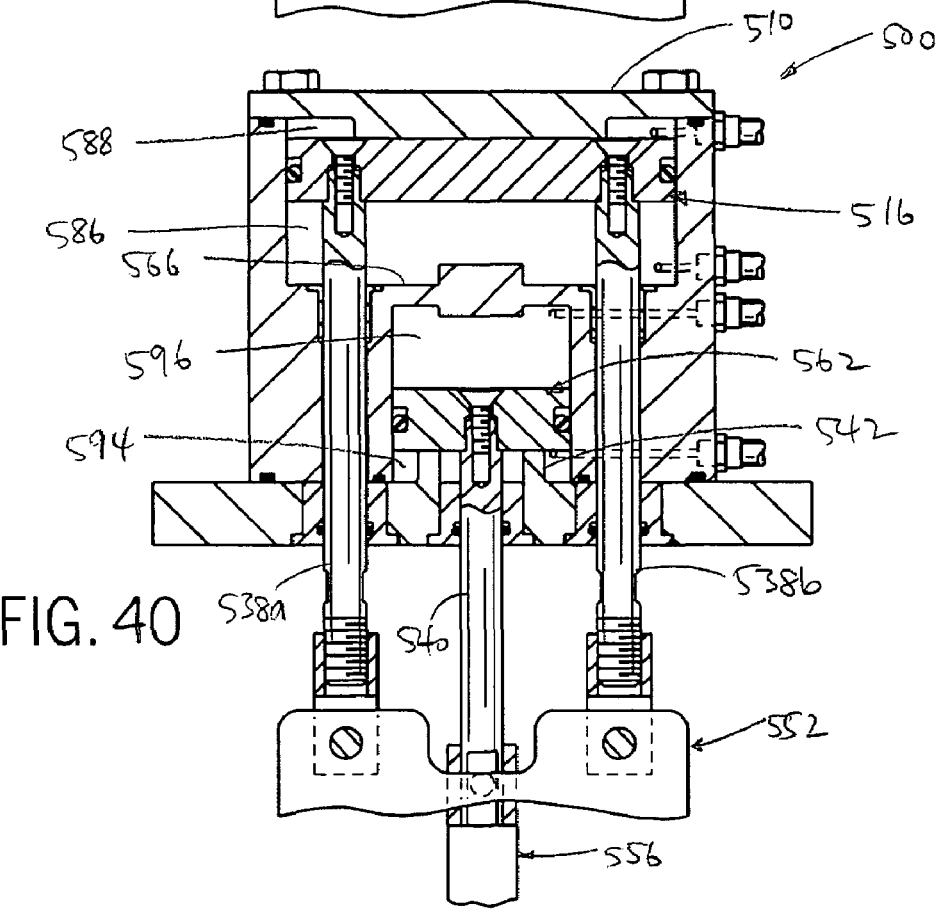
FIG. 40 is a view similar to FIGS. 37-39, showing the cylinder assembly in a position in which the seal bar is raised.

The knife piston 562 is illustrated in its fully retracted position in FIGS. 37 and 38 and in its fully extended position in FIGS. 39 and 40. A knife piston lower volume 594 is defined by the side walls 564 of the knife piston housing 560, the lower face 572 of the knife piston 562 and the cylinder base 524. When knife piston 562 is fully lowered, knife piston lower volume 594 is defined by the annular area located outwardly of base central wall 542. A knife piston upper volume 596 is defined by the side walls 64 of the knife piston housing 560, the transverse wall 566 of the knife piston housing 560, and the upper face 572 of the knife piston 562. When knife piston 562 is fully raised, the knife piston upper volume 596 is defined by the area located outwardly of protrusion 574.

Knife piston upper volume 596 is in fluid communication through a knife piston primary upper fluid channel which extends through the cylinder block 504 to a knife piston upper primary inlet/exhaust port 598, thereby providing communication between the upper volume 596 and the exterior environment. A compressed fluid source (not shown) is connected to the inlet/exhaust port 598 to selectively supply a fluid, preferably air, to the upper face 572 of the knife piston 562. Thus, by rapidly providing air through the fluid channel into the knife piston upper recesses upper volume 596, the upper volume 596 expands, thereby moving the knife piston 562 into its extended position.

The knife piston lower volume 594 is in fluid communication with a knife piston primary lower fluid channel, which extends radially outward through the inner surface of the cylinder block 504 and is in fluid communication with a knife piston primary lower inlet/exhaust port 600, which establishes communication between the knife piston lower volume 594 and the exterior environment. A compressed fluid source is connected to the primary lower inlet/exhaust port 600 to selectively supply a fluid, preferably air, to the lower face 572 of the knife piston 562. By rapidly providing air to the lower face 572 of the knife piston 562, the knife piston 562 is raised from its extended position into its retracted position.

In operation, fluid is selectively applied to cylinder assembly 500 as described above, to either extend or retract seal bar 552 or knife 556, to accomplish the desired operation at the desired time in the sequence of operation of vacuum packaging system 100. Seal bar 552 is rigidly maintained in a transverse orientation within the vacuum head 116 by the dual couplings 550*a*, 550*b*. Knife 556, which is supported by a single coupling 558 is prevented from rotation relative due to its close proximity to the adjacent surface of seal bar 552. A thin plastic (e.g. Nylatron) spacer may be secured either to the surface of knife 556 or the surface of seal bar 552, to facilitate the relative sliding movement between seal bar 552 and knife 556 during operation of cylinder assembly 500 and to maintain knife 556 in the desired orientation relative to seal bar 552.

As can be appreciated from the above description and the attached figures, the dual action air cylinder 500 provides for a dual piston assembly within the same air cylinder body. The pistons are capable of moving in opposed or similar directions at the same time within the cylinder body. This replaces the air cylinders of the prior art wherein separate air cylinders contain separately operable pistons. The dual air cylinder assemblies of the prior art required numerous parts and complex maintenance. Accordingly, the present system provides a significant decrease in the number of parts that are required for a vacuum packaging assembly, and further allows the evacuation, sealing, and cutting to occur within a single vacuum chamber.

While cylinder assembly invention has been shown and described with respect to a specific embodiment, it is contemplated that certain details may vary from the specific construction as disclosed, while still falling within the scope of the present invention. For example, and without limitation, while the knife piston 562 is illustrated as being engaged with a single knife piston rod 540, it is contemplated that, if desired, the knife piston 562 could be attached to a plurality of piston rods which are also attached to a plurality of knives. It is also contemplated that the dual action cylinder assembly may be operated using a fluid other than air, e.g. a hydraulic fluid. In addition, it is contemplated that action of one or both of the pistons in one direction may be accomplished using a spring or other satisfactory biasing means that bears against the piston to urge the piston in one direction relative to the cylinder body. In an arrangement such as this, pressurized fluid is supplied to the opposite side of the piston in order to move the piston in the opposite direction, against the force of the spring or other biasing means.

While cylinder 500 has been shown and described in connection with movement of a seal bar and a knife in a vacuum packaging application, it is understood that this application is illustrative of any number of applications in which cylinder 500 may be employed. Cylinder 500 may be effectively used in any application in which movement of two adjacent components between two positions, such as extended and retracted positions, is required.

Bag Clamp

FIGS. 13, 36 and 41-43 Illustrate a bag clamp, shown generally at 700, that is contained within each of vacuum chambers 116a-c for use in clamping the open end of the vacuum packaging receptacle R within which the product to be packaged is contained. As noted previously, base member 280 is secured to the upper surface of each platen 108. Base member 280 functions to mount the U-shaped clamp and seal member 278, which has an inner leg 702 and an outer leg 704. A heat seal strip 706 is mounted to the upper end of inner leg 702. A series of spaced apart lower bag clamp areas 708 extend upwardly from the upper end of outer leg 704.

The evacuation chamber, shown generally at 116, defines an interior that overlies platen 108, as described previously, and which is selectively evacuated so as to evacuate the interior receptacle R, which is located within vacuum chamber 116. In order to maintain the open end of the receptacle R in position during the evacuation operation, an upper bag clamp member 710 is mounted within the interior of evacuation chamber 116. Upper bag clamp member 710 is in vertical alignment with outer leg 704, so that upper bag clamp member 710 is moved toward lower bag clamp areas 708 when evacuation chamber 116 is lowered onto platen 108. Upper bag clamp member 710 includes a series of spaced apart upper bag clamp areas 712, each of which is in vertical alignment with one of lower bag clamp areas 708. With this arrangement, upper bag clamp areas 712 engage lower bag clamp areas 708 when evacuation chamber 116 is lowered into engagement with platen 108, to clamp the open end of the receptacle R within which the item to be packaged is contained.

Lower bag clamp areas 708 and upper bag clamp areas 712 may include resilient material defining the facing surfaces, which functions both as a cushion during engagement of lower bag clamp areas 708 and upper bag clamp areas 712, and also to provide a secure frictional engagement of bag clamp areas 708, 712 with the walls of receptacle R. In addition, upper bag clamp member 710 may also be mounted via within the interior of chamber 42 via a mounting bracket 714 that includes one or more springs 716, to provide additional cushioning when upper bag clamp member 710 is moved into engagement with lower bag clamp areas 708.

The open areas between lower bag clamp areas 708 and upper bag clamp areas 712 define a series of spaced apart evacuation passages when lower bag clamp areas 708 and upper bag clamp areas 712 are engaged together. During the evacuation operation, the walls of receptacle R conform to the facing surfaces defined by the lower bag clamp member 704 and the upper bag clamp member 710 between bag clamp areas 708, 712, to enable air to pass from the interior of the receptacle R to thereby evacuate the receptacle R.

Operation

In operation of vacuum packaging system 100, and with general reference to FIGS. 1-6, the primary path of travel of the vacuum packaging system 100 is designated by the numeral 104. The movement of the system 100 involves the linear synchronous movement of the two main component parts of the system 100, namely the conveyor 102 and the carriage assembly 112, which provides movement of the vacuum chambers 116a-c. As illustrated in the drawings, the linear movement of the system 100 can be generally described as including four sequential positions or movements including upstream engaged position as shown in FIG. 3, a downstream engaged position as shown in FIG. 4, a downstream disengaged position as shown in FIG. 5, and a successive upstream disengaged position as shown in FIG. 6.

Prior to initiation of operation of the linear motion reciprocating vacuum packaging system 100, an automated or manual bag loading system (not shown) can be used to transfer a bagged product (not shown) from a separate conveyor or other means for supplying product onto individual platens 108 of the conveyor 102. The bagged product can be a food item, which is contained in an open receptacle R. Preferably, an operator or automated loading system places an individually bagged product on each of the three successive platens 108 at the loading area L of the conveyor 102.

As the three loaded platens 2108 are advanced downstream from loading station L by operation of conveyor 102 in the primary path of travel 104, the carriage assembly 112 is at its upstream position and vacuum heads 116a-c are raised, as shown in FIGS. 1 and 6. The vacuum chambers 116a-c on the support beam 114 of the carriage assembly 112 are vertically aligned with the three loaded platens 108 on the conveyor 102. Carriage assembly 112 is then operated so as to lower vacuum chambers 116a-c onto the underlying platens 108, as shown in FIG. 3, so that each individual vacuum chamber 116a, 116b, 116c merges with an individual platen 108 in order to initiate the evacuation of air from the bagged products on the platens 108. Preferably, carriage assembly 112 is operated so as to move vacuum chambers 116a-c along with conveyor 102, to provide continuous motion. Alternatively, carriage assembly 112 and conveyor 102 may be stopped when carriage assembly 112 is operated to lower vacuum chambers 116a-c, in an indexing motion arrangement. When vacuum chambers 116a-c are lowered onto platens 108, the lower edge of each vacuum chamber 116a-c seats against the loaded platen 108 of the conveyor 102, thereby affecting an air tight seal. After seating against the platen 108, the vacuum chambers 116a-c are exposed to a vacuum source (not shown) through the support beam 114 and vacuum valves 400, as described above, to evacuate air from within the chambers 116a-c and the receptacle R supported by the underlying platens 26. Following the completion of evacuation, the open ends of the receptacles R are then sealed by heated seal bar 552 acting against seal strip 706, and then the excess plastic of each bag is cut by a knife 556. In the manner as describe above, dual action cylinder 500 functions to sequentially move seal bar 552 and knife 556, at desired points in the movement of the platens 108 and the vacuum chambers 116a-c.

Each of the described sequential actions, evacuation, sealing and cutting of the packaged product, occurs within a single vacuum chamber 116a-c during the synchronous linear movement of the vacuum chambers 116a-c and platens 108 between the upstream position of FIG. 3 and the downstream position of FIG. 4.

When the vacuum packaging system 100 reaches the downstream position of FIG. 4, at which time the product is vacuum packed and sealed, vacuum valves 400 are operated to vent the vacuum chambers 116a-c, which thereby releases the seal between the chambers 116a-c and the platens 108. The vacuum chambers 116a-c are then moved upwardly by operation of carriage assembly 112, to disengage and separate vacuum chambers 116a-c from the platens 108 as shown in FIG. 5.

Carriage assembly 112 is then operated to maintain vacuum chambers 116a-c in the raised position and to return vacuum chambers 116a-c to the upstream position of FIG. 6. Carriage assembly 112 is rapidly reciprocated in the reverse direction relative to the downstream direction 104, either while conveyor 102 continues to advance the upstream set of platens 108 or while maintaining the platens stationary. In either event, the servo operation of the various components and systems enables the motion to be closely controlled, so that the above-described steps in vacuum packaging and sealing articles on the upstream set of platens 108 is repeated.

Typically, a sensor is employed to determine whether a platen 108 is empty. If this is the case, the vacuum packaging system 100 is operated so as to prevent the empty platen 108 from being exposed to vacuum, and to prevent actuation of the sealing and cutting components of the vacuum head.

It is understood that the present system allows for continuous, indexing or intermittent movement of the system 100, thereby allowing for demand-feed packaging.

While the system has been shown and described with respect to a specific embodiment, it is contemplated that certain details may vary from the specific construction as disclosed, while still falling within the scope of the present invention. For example, and without limitation, while carriage assembly 112 is illustrated as having two horizontal rails and a vertical mast, it is contemplated that any carriage assembly that allows for horizontal and vertical movement in relation to a conveyor or other moving means may be employed. In addition, it is also contemplated that conveyor 102 may be any conventional moving means, which may be separate from the carriage assembly or integrally formed with the carriage assembly. Further, while the invention has been shown and described as having three evacuation chambers, it is understood that this number of chambers is illustrative and that any other number of chambers may be employed. It is also understood that, while the invention has been described with respect to the product being contained within a bag, the product may be contained within any other type of package or receptacle capable of being evacuated and sealed.

Various alternatives and embodiments are contemplated as being within the scope of the following claims particularly pointing out and distinctly claiming the subject matter regarded as the invention.

I claim:

1. A conveyor belt construction, comprising:
a flexible conveyor belt defining inner and outer oppositely facing surfaces;
an inner clamp member defining a convex belt engaging area with which the inner surface of the flexible conveyor belt is engaged; and
an outer clamp member defining a concave belt engaging area with which the outer surface of the flexible conveyor belt is engaged;
wherein the inner and outer clamp members and the belt are secured together and the belt is sandwiched between the concave and convex areas of the outer and inner clamp members, respectively, wherein the inner and outer clamp members are movable along with the belt at all times, and wherein the convex belt engaging area of the inner clamp member and the concave belt engaging area of the outer clamp member cooperate to form an arcuate area in the belt between the inner clamp member and the outer clamp member; and
a fastener arrangement that couples the inner clamp member and the outer clamp member to one another and to the belt at all times, wherein the fastener arrangement is movable along with the belt and the inner and outer clamp members, and is operable to secure the inner and outer clamp members together in a fixed position along the length of the belt.

2. The conveyor belt construction of claim 1, further comprising a series of sets of inner and outer clamp members secured together at locations along the length of the flexible conveyor belt.

3. The conveyor belt construction claim 1, wherein the conveyor belt construction is engaged with a pair of rotatable members, and wherein the concave and convex belt engaging areas of the outer and inner clamp members, respectively, of each set of clamp members function to take up a length of the flexible conveyor belt so as to tighten the flexible conveyor belt onto the pair of rotatable members without the use of a belt tensioner.

4. The conveyor belt construction of claim 2, further comprising a conveying member mounted to one or more of the outer clamp members.

5. The conveyor belt construction of claim 4, wherein each conveying member comprises a platen defining an outwardly facing surface adapted to support an article to be conveyed.

6. The conveyor belt construction of claim 2, further comprising engagement structure interposed between each inner clamp member and the inner surface of the conveyor belt with which the inner clamp member is engaged.

7. The conveyor belt construction of claim 6, wherein the conveyor belt is formed of two or more belt sections, and wherein the inner and outer clamp members overlie adjacent ends of adjacent belt sections to splice the belt sections together.

8. The conveyor belt construction of claim 6, wherein the engagement structure comprises a series of transverse ridges and grooves on the inner surface of the conveyor belt along the length of the conveyor belt, and a series of mating transverse ridges and grooves on the convex belt engaging area of the inner clamp member that engage the ridges and grooves on the inner surface of the conveyor belt.

9. A conveyor, comprising:
a pair of rotatable members linearly spaced from one another, at least one of which comprises a drive member;
a flexible conveyor belt trained around the pair of rotatable members and defining an inner surface and an outer surface, wherein the inner surface is engaged with the pair of rotatable members;
a series of sets of fixed position clamp members engaged with the flexible conveyor belt at all times at spaced locations along the length of the flexible conveyor belt, wherein each set of clamp members includes an inner clamp member engaged with the inner surface of the conveyor belt and an outer surface engaged with the outer surface of the conveyor belt, wherein the inner and outer clamp members and the flexible conveyor belt are secured together at all times in a fixed location along the belt such that the flexible conveyor belt is sandwiched between the first and second clamp members and the first and second clamp members are movable at all times together with the belt around the pair of rollers as the belt is driven around the pair of rollers;
wherein the inner and outer clamp members define mating arcuate engagement surfaces that engage the inner and outer surfaces, respectively, of the conveyor belt, and wherein the engagement of the flexible conveyor belt with the arcuate engagement surfaces is operable to tension the conveyor belt about the pair or rotatable members.

10. The conveyor of claim 9, further comprising a conveying member mounted to each of the outer clamp members.

11. The conveyor of claim 10, wherein each conveying member comprises a platen defining an outwardly facing surface adapted to support an article to be conveyed.

12. The conveyor of claim 11, further comprising an upper guide rail extending along an upper run defined by the conveyor, wherein each platen includes at least one inwardly facing guide member that engages the upper guide rail.

13. The conveyor of claim 12, further comprising a lower guide rail extending along a lower run defined by the conveyor, wherein each platen includes at least one inwardly facing support member that engages the lower guide rail.

14. The conveyor of claim 9, further comprising engagement structure interposed between each inner clamp member and the inner surface of the conveyor belt.

15. The conveyor of claim 14, wherein the engagement structure comprises a series of transverse ridges and grooves on the inner surface of the conveyor belt along the length of the conveyor belt, and a series of mating transverse ridges and grooves on the arcuate area of the inner clamp member that engage the ridges and grooves on the inner surface of the conveyor belt.

16. A method of tightening a conveyor belt about a pair of rotatable members, comprising the acts of;
   providing a conveyor belt having an inwardly facing surface and an outwardly facing surface;
   positioning the conveyor belt about the pair of rotatable members;
   providing a series of clamp assemblies, wherein each clamp assembly includes an inner clamp member having an arcuate inner engagement area and an outer clamp member having an arcuate outer engagement area that mates with the inner engagement area of the inner clamp member;
   securing the inner clamp member and the outer clamp member of each clamp assembly together with the conveyor belt therebetween at a fixed location along the length of the conveyor belt, wherein the inner and outer clamp members and the conveyor belt are secured together at all times and the inner and outer clamp members are movable together with the belt at all times, wherein the conveyor belt is sandwiched between the arcuate inner engagement area and the arcuate outer engagement area, wherein the arcuate inner and outer engagement areas of the inner and outer clamp members, respectively, of the clamp assemblies take up slack in the belt to tighten the belt onto the rotatable members, wherein the clamp assemblies maintain engagement with the belt at the fixed location at all times as the belt is rotated around the rotatable members.

17. The method of claim 16, further comprising the act of securing a conveying member to each of the outer clamp members.

18. The method of claim 17, wherein the act of securing a conveying member to each of the outer clamp members comprises securing a platen defining an outwardly facing support surface to each of the outer clamp members.

19. The method of claim 16, wherein the inner surface of the conveyor belt includes engagement structure, and further comprising the act of providing engagement structure on each inner clamp member that mates with and engages the engagement structure on the inner surface of the conveyor belt.

20. The method of claim 19, wherein the engagement structure on the inner surface of the conveyor belt comprises a series of transverse ridges and grooves along the length of the conveyor belt, and wherein the act of providing engagement structure on each inner clamp member comprises providing a series of mating transverse ridges and grooves on the arcuate area of the inner clamp member that engage the ridges and grooves on the inner surface of the conveyor belt.

21. A conveyor belt construction, comprising:
   flexible conveyor belt means defining first and second oppositely facing surfaces;
   clamp means engaged with and secured to the oppositely facing surfaces of the flexible conveyor belt means, wherein the clamp means includes arcuate engagement means for engaging the flexible conveyor belt means, and wherein the clamp means is secured to the flexible conveyor belt means at a fixed location along the length of the flexible conveyor belt means, wherein the clamp means and the conveyor belt means are secured together at all times and the clamp means is movable together with the flexible conveyor means at all times, wherein the clamp means comprises first and second clamp members, wherein the arcuate engagement means comprises facing arcuate engagement surfaces defined by the first and second clamp members between which the conveyor belt means is located; and
   fastener means extending between and retaining the first and second clamp members together with the conveyor belt means therebetween, wherein the fastener means couples the first and second clamp members to one another and to the belt at all times.

* * * * *